US009070040B2

(12) United States Patent
Harada et al.

(10) Patent No.: US 9,070,040 B2
(45) Date of Patent: Jun. 30, 2015

(54) VIDEO PROCESSING SYSTEM, METHOD OF DETERMINING VIEWER PREFERENCE, VIDEO PROCESSING APPARATUS, AND CONTROL METHOD

(75) Inventors: Hiroo Harada, Tokyo (JP); Naotake Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/236,752

(22) PCT Filed: Jul. 31, 2012

(86) PCT No.: PCT/JP2012/069930
§ 371 (c)(1),
(2), (4) Date: Feb. 3, 2014

(87) PCT Pub. No.: WO2013/018913
PCT Pub. Date: Feb. 7, 2013

(65) Prior Publication Data
US 2014/0169679 A1   Jun. 19, 2014

(30) Foreign Application Priority Data
Aug. 4, 2011   (JP) .................................. 2011-170864

(51) Int. Cl.
*G06K 9/00*   (2006.01)
*G06K 9/46*   (2006.01)
(Continued)

(52) U.S. Cl.
CPC ............... *G06K 9/46* (2013.01); *H04N 21/251* (2013.01); *H04N 21/44222* (2013.01); *H04N 21/6582* (2013.01); *H04N 21/8456* (2013.01)

(58) Field of Classification Search
CPC ....................... G06K 9/00718; G06K 9/00624
See application file for complete search history.

(56) References Cited

U.S. PATENT DOCUMENTS

| 8,510,385 B1* | 8/2013 | Najm et al. .................... 709/205 |
| 2013/0031107 A1* | 1/2013 | Pan et al. ....................... 707/749 |

FOREIGN PATENT DOCUMENTS

| JP | 2006-309660 | 11/2006 |
| JP | 2006-333451 | 12/2006 |

(Continued)

OTHER PUBLICATIONS (Brezeale et al., "Learning Video Preferences Using Visual Features and Closed Captions", Jul. 2009, IEEE).*

(Continued)

*Primary Examiner* — Stephen R Koziol
*Assistant Examiner* — Totam Le
(74) *Attorney, Agent, or Firm* — Finnegan, Henderson, Farabow, Garrett & Dunner LLP

(57) ABSTRACT

A video processing apparatus includes a first storage means unit which stores, in correspondence to a viewer, frame feature values to characterize each frame of scenes constituted by a series of frames in a video content viewed by the viewer; a second storage means unit which stores, as scene groups classified by attributes of the scenes, the frame feature values of scenes constituted by the series of frames; an interest level accumulation means unit which compares the frame feature values stored in the first storage means unit with the frame feature values stored in the second storage means unit, and in case the compared frame feature values match, increases a score about the viewer which represents the interest level with respect to the scene group of which the frame feature values match; and a viewer preference determination means unit which determines that the scene groups of the which the scores are higher are the scene groups preferred by the viewer.

15 Claims, 26 Drawing Sheets

(51) Int. Cl.
*H04N 21/25* (2011.01)
*H04N 21/442* (2011.01)
*H04N 21/658* (2011.01)
*H04N 21/845* (2011.01)

(56) References Cited

FOREIGN PATENT DOCUMENTS

| JP | 2009-296346 | 12/2009 |
| JP | 2010-074518 | 4/2010 |
| JP | 2010-258615 | 11/2010 |
| JP | 2011-118498 | 6/2011 |

OTHER PUBLICATIONS (Ferreira et al., "Content-Based Image Classification: A Non-Parametric Approach", Oct. 2010; http://citeseerx.ist.psu.edu/viewdoc/download;jsessionid=EF2F3ADFD3E2B6671C2496290A7D708C?doi=10.1.1.186.3191&rep=rep1&type=pdf).*
(McDuff et al., "Measuring Voter's Candidate Preference Based on Affective Responses to Election Debates", 2013; http://affect.media.mit.edu/pdfs/13.McDuff-etal-Measuring.pdf).*
International Search Report and Written Opinion mailed Sep. 25, 2012.

* cited by examiner

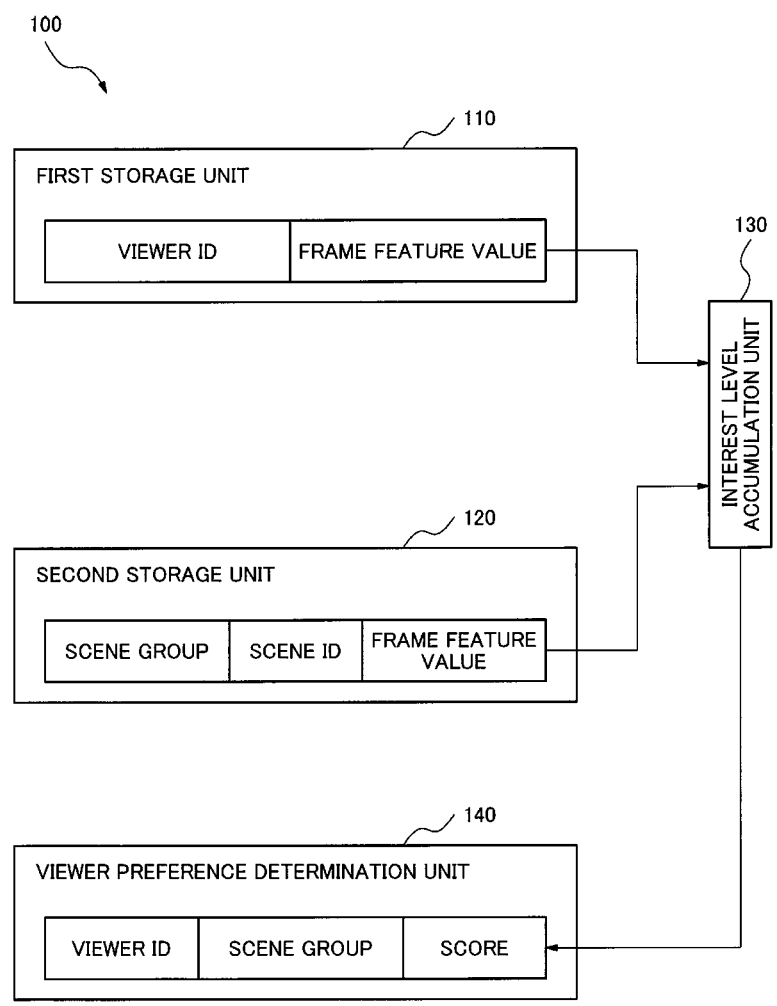

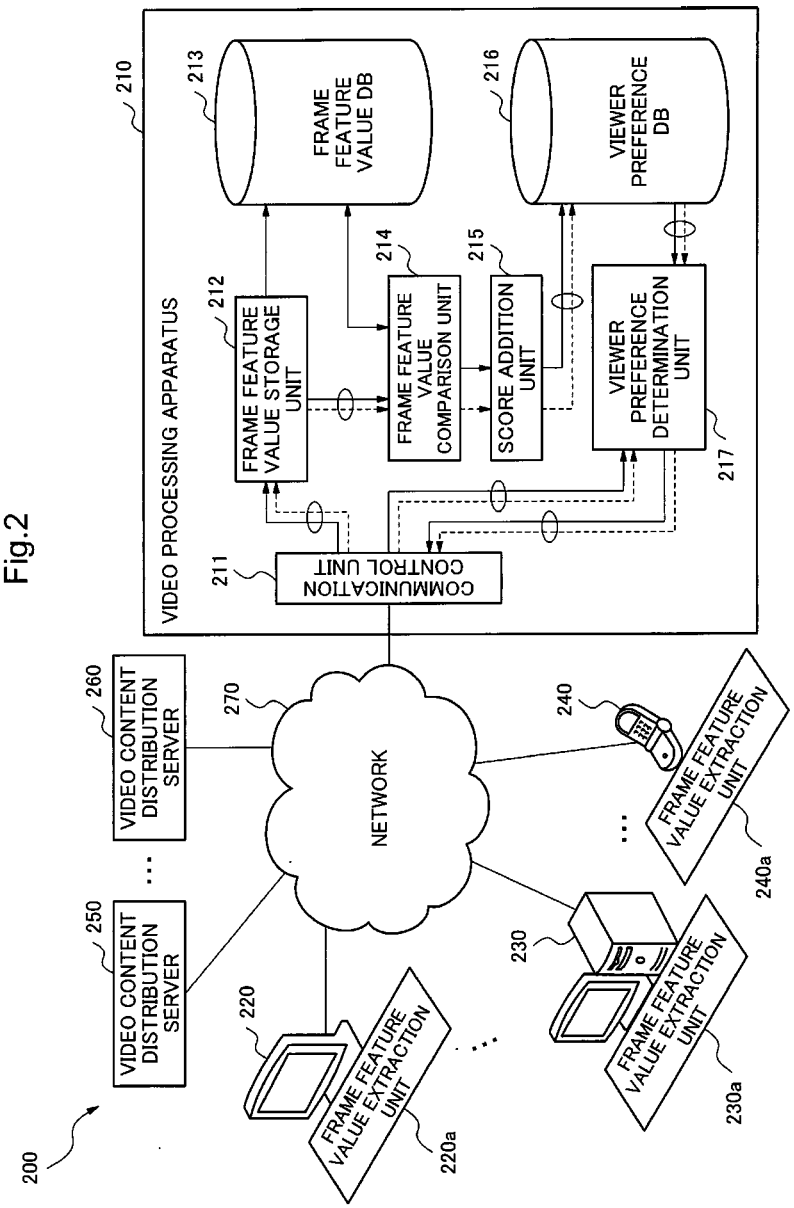

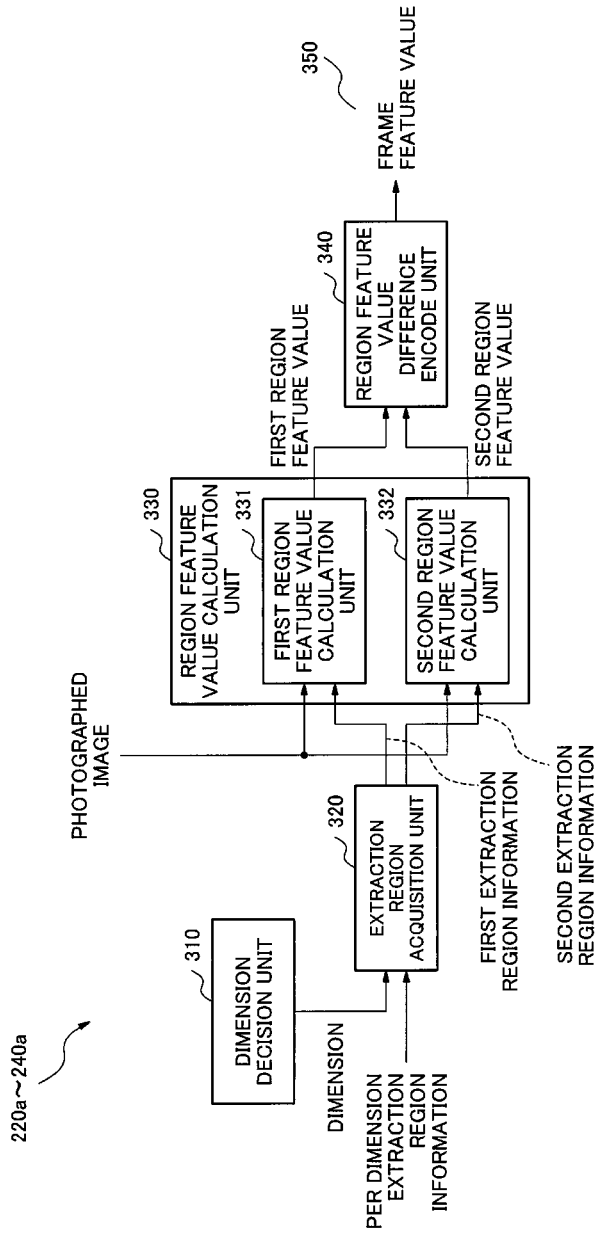

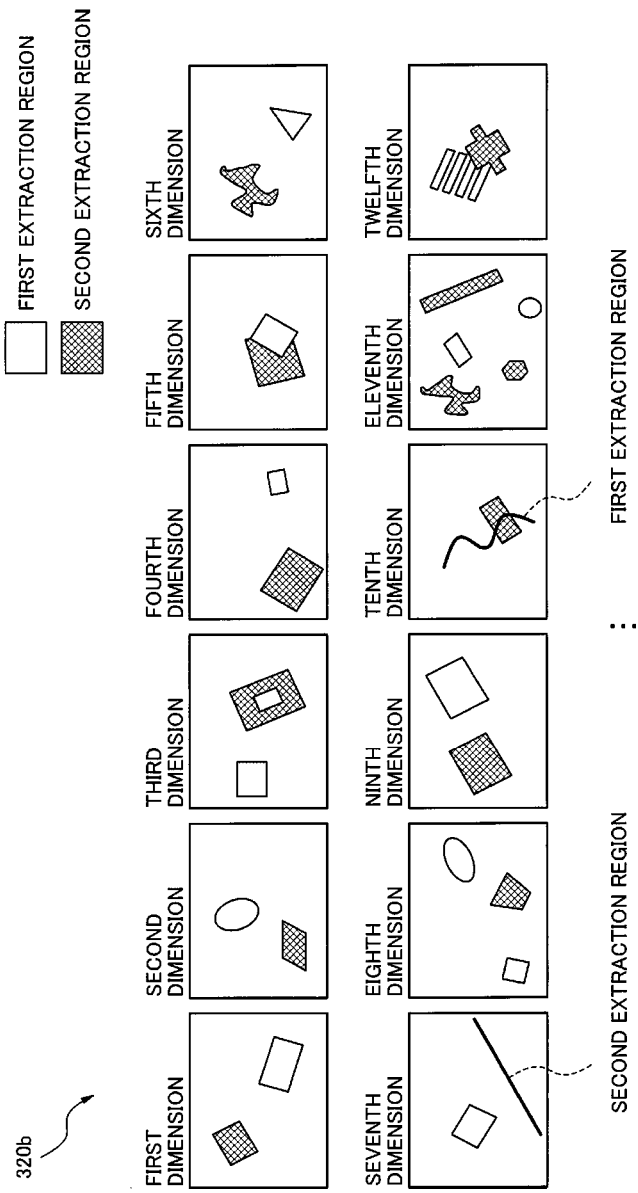

Fig.9

| VIEWER ID 901 | FRAME FEATURE VALUE 902 | BROADCAST/ REPRODUCTION 903 | REPRODUCTION SYSTEM 904 | REACTION (+/−) 905 | WEIGHTED TOTAL AMOUNT 906 |
|---|---|---|---|---|---|
| MS. X | | | | | |
| MR. Y | | | | | |
| ... | | | | | |

| SCENE GROUP | SCENE ID | SUBJECT ID |
|---|---|---|
| C | C1 | MISORA 1 |
| | C2 | MISORA 2 |
| | E2 | MISORA 5 |
| | ⋮ | |
| D | D1 | SAYURI 1 |
| | ⋮ | |

Fig.15

| VIEWER ID 1501 | SCENE GROUP 1502 | ATTRIBUTE 1503 | SCORE 1504 |
|---|---|---|---|
| MS. X | A | FRAME FEATURE VALUE | |
| | B | FRAME FEATURE VALUE | |
| | C | SUBJECT | |
| | ... | | |
| MR. Y | A | FRAME FEATURE VALUE | |
| | D | SUBJECT | |
| | ... | | |

| SCENE GROUP | SCENE ID | FRAME FEATURE VALUE | SUBJECT ID |
|---|---|---|---|
| A | A1 | | |
| | A2 | | |
| | E3 | | |
| | ... | | |
| B | B1 | | |
| | ... | | |

VIDEO PROCESSING SYSTEM, METHOD OF DETERMINING VIEWER PREFERENCE, VIDEO PROCESSING APPARATUS, AND CONTROL METHOD

CROSS-REFERENCE TO RELATED PATENT APPLICATIONS

This application is a National Stage Entry of International Application No. PCT/JP2012/069930, filed Jul. 31, 2012, which claims priority from Japanese Patent Application No. 2011-170864, filed Aug. 4, 2011. The entire contents of the above-referenced applications are expressly incorporated herein by reference.

TECHNICAL FIELD

The present invention relates to a technology which determines preference of a viewer who views a video.

BACKGROUND ART

As a technology which determines preference of a viewer who views a video, PLT 1 discloses the technology which determines a scene, including a feature value close to a feature value of a reproduction scene after fast forwarding or rewinding at the time of video reproduction, to be a scene preferred by the viewer.

CITATION LIST

Patent Literature

[PLT 1] Japanese Unexamined Patent Application Publication No. 2010-258615

SUMMARY OF INVENTION

Technical Problem

The technology of PLT 1 mentioned above can determine preference of the viewer by a unit of an individual scene, however; it cannot determine the preference of the viewer from contents what the viewer had continued to view nor track a change of the preference of the viewer.

The object of the present invention is to provide a video processing system, a method of determining viewer preference, a video processing apparatus, a control method in order to solve the problems mentioned above.

Solution to Problem

According to one aspect of the present invention, a video processing apparatus includes, a first storage unit which stores, in correspondence to a viewer, frame feature values to characterize each frame of scenes constituted by a series of frames in a video content viewed by the viewer;

a second storage unit which stores, as scene groups classified by attributes of the scenes, the frame feature values of scenes constitute by the series of frames;

an interest level accumulation unit which compares the frame feature values stored in the first storage unit with the frame feature values stored in the second storage unit, and in case the compared frame feature values match, increases a score about the viewer which represents the interest level with respect to the scene group of which the frame feature values match; and a viewer preference determination unit which determines that the scene groups of the which the scores are higher are the scene groups preferred by the viewer.

According to one aspect of the present invention, a control method of a video processing apparatus includes, comparing frame feature values to characterize each frame of scenes constituted by a series of frames in a video content stored in correspondence to a viewer and viewed by the viewer with frame feature values divided into groups by attributes in the scenes constituted by the series of frames and stored as scene groups, and in case the compared frame feature values match, increasing a score about the viewer which represents an interest level with respect to the scene group of which the frame feature values match; and determining that the scene groups of which the scores are higher are the scene groups preferred by the viewer.

According to one aspect of the present invention, A non-transitory computer readable medium storing a program executed by a computer, includes, comparing frame feature values to characterize each frame of scenes constituted by a series of frames in a video content stored in correspondence to a viewer and viewed by the viewer with frame feature values divided into groups by attributes in the scenes constituted by the series of frames and stored as scene groups, and in case the compared frame feature values match, increasing a score about the viewer which represents an interest level with respect to the scene group of which the frame feature values match; and determining that the scene groups of which the scores are higher are the scene groups preferred by the viewer.

According to one aspect of the present invention, a video processing system which determines preference of a viewer on the basis of a video content viewed by the viewer, includes a frame feature value extraction unit which extracts frame feature values which characterize each frame of scenes constituted by a series of frames contained in the video content viewed by the viewer;

a first storage unit which stores the frame feature values which the frame feature value extraction unit extracted in correspondence to the viewer;

a second storage unit which groups the frame feature values of the scenes constituted by the series of frames into groups according to attributes included in the scenes and stories as scene groups;

an interest level accumulation unit which compares the frame feature values stored in the first storage unit with the frame feature values stored in the second storage unit, and in case there are matching in the compared frame feature values, increases a score about the viewer which represents the interest level with respect to the scene group of which frame feature values match; and a viewer preference determination unit which determines that the scene groups of which the scores are higher are the scene groups preferred by the viewer.

According to one aspect of the present invention, a viewer preference determination method which determines preference of a viewer on the basis of a video content viewed by the viewer, includes extracting frame feature values to characterize each frame of scenes constituted by a series of frames in the video content viewed by the viewer;

comparing frame feature values in the video content stored in correspondence to a viewer and viewed by the viewer with the frame feature values which are grouped into groups according to attributes in the scene constituted by the series of frames and stored as scene groups, and in case the compared frame feature values match, increasing a score about the viewer which represents an interest level with respect to the scene group of which the frame feature values match; and determining that the scene groups of which the scores are higher are the scene groups preferred by the viewer.

Advantageous Effects of Invention

The present invention can determine preference of a viewer from contents what the viewer has continued to view and track a change of the preference of the viewer.

BRIEF DESCRIPTION OF DRAWINGS

FIG. 1 is a block diagram showing a part of a structure of a video processing system according to a first exemplary embodiment of the present invention.

FIG. 2 is a block diagram showing a structure of a video processing system according to a second exemplary embodiment of the present invention.

FIG. 3A is a block diagram showing a structure of a frame feature value extraction unit according to the second exemplary embodiment of the present invention.

FIG. 3C is a figure showing extraction regions in the frame feature value extraction unit according to the second exemplary embodiment of the present invention.

FIG. 9 is a figure showing a structure of a frame feature value storage unit according to a third exemplary embodiment of the present invention.

FIG. 14 is a figure showing a structure of a subject DB according to the fifth exemplary embodiment of the present invention.

FIG. 15 is a figure showing a structure of a viewer preference DB according to the fifth exemplary embodiment of the present invention.

FIG. 18 is a figure showing a structure of a frame feature value/subject DB according to the sixth exemplary embodiment of the present invention.

DESCRIPTION OF EMBODIMENTS

Figure 3B:
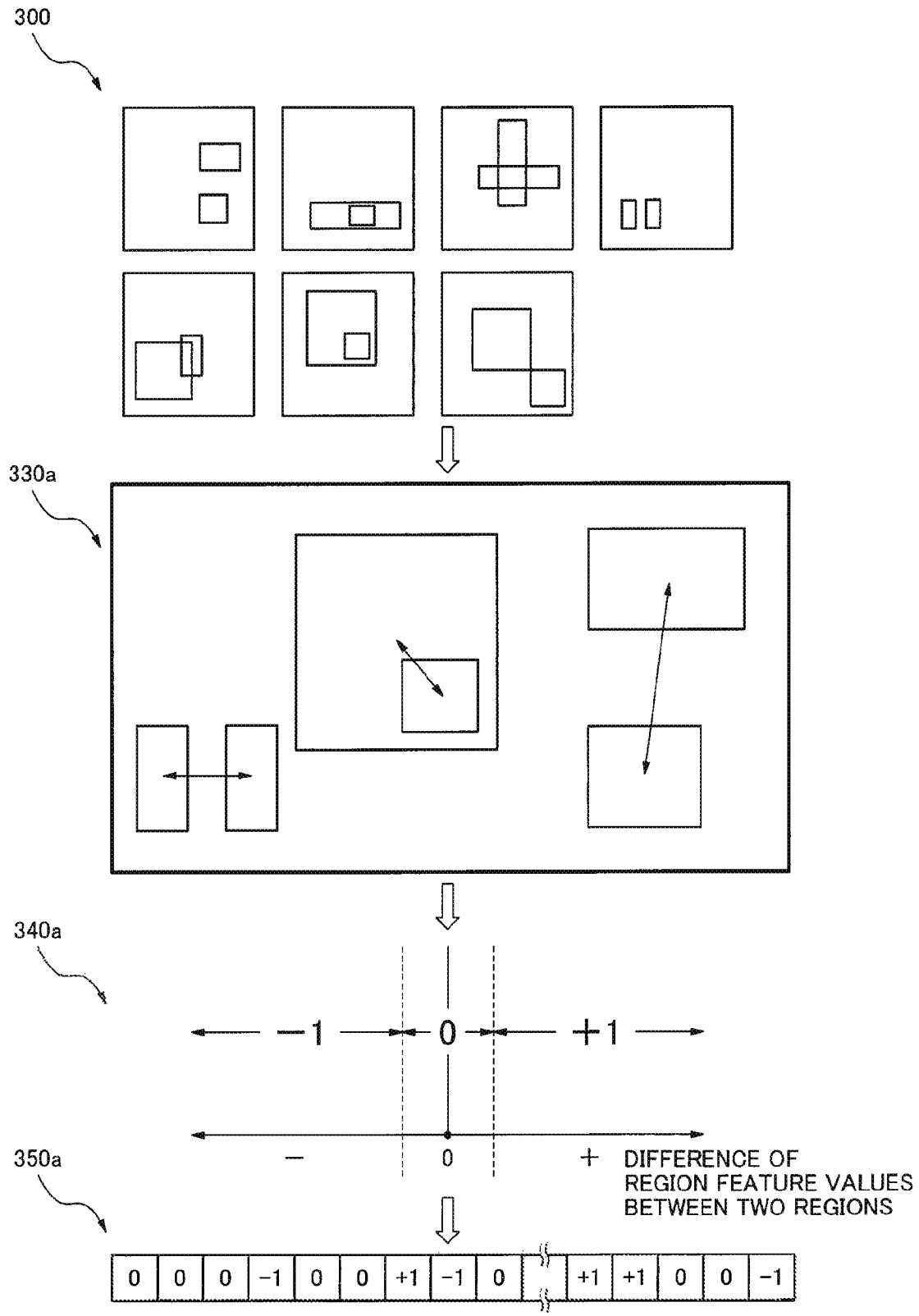
FIG. 3B is a figure showing processing in the frame feature value extraction unit according to the second exemplary embodiment of the present invention.

In the following, exemplary embodiments of the present invention will be explained exemplarily and in detail with reference to drawings. However, components described in the following exemplary embodiments are exemplifications at most and are not intended to limit technological scopes of the present invention only to those.

Further, it is supposed that wording "agree" used in this description shows a case of perfect identity, and wording "match" shows a case judged to be within a range of a predetermined similarity.

The First Exemplary Embodiment

A video processing system 100 as the first exemplary embodiment of the present invention will be explained using FIG. 1.

As shown in FIG. 1, the video processing system 100 contains a first storage unit 110, a second storage unit 120, an interest level accumulation unit 130 and a viewer preference determination unit 140.

The first storage unit 110 stores, in correspondence to a viewer, frame feature values to characterize each frame of scenes constituted by a series of frames in a video content viewed by the viewer.

The second storage unit 120 stores, as scene groups classified by attributes of the scenes, the frame feature values of scenes constituted by the series of frames.

The interest level accumulation unit 130 compares the frame feature values stored in the first storage unit 110 with the frame feature values stored in the second storage unit 120. In case the compared frame feature values match, the interest level accumulation unit 130 increases a score about the viewer which represents an interest level with respect to the scene group having the matched frame feature values.

The viewer preference determination unit 140 determines that the scene groups of the which the scores are higher are the scene groups preferred by the viewer.

According to this exemplary embodiment, it is possible to determine the viewer preference from contents what the viewer has continued to view and to track a change of the viewer preference.

The Second Exemplary Embodiment

Next, a video processing system according to the second exemplary embodiment will be explained.

The video processing system according to this exemplary embodiment is provided with a video viewing terminal, a video content distribution server and a video processing apparatus.

During viewing a video content distributed from the video content distribution server, the video viewing terminal extracts a frame feature value from each frame which constitutes the video content and sends the frame feature value to the video processing apparatus.

The video processing apparatus compares the frame feature value received from the video viewing terminal with frame feature values stored in a frame feature value DB (DATABASE) of the video processing apparatus. The frame feature value DB stores the frame feature values structured feature values of scenes in correspondence to scene groups. The scene groups are set for each user preference classification such as a genre of the video content or performers in each scene.

As a result of comparison, the video processing apparatus adds scores of the scene groups of which the frame feature values matched. By accumulating this processing, the scene groups with high scores are determined to be the video contents or the scenes with the preference of the viewer.

According to this exemplary embodiment, preference of the viewer can be determined easily from viewing and reproduction operation of the viewer using the video viewing terminal.

<<Structure of the Video Processing System>>

FIG. 2 is a block diagram showing a structure of a video processing system 200 according to this exemplary embodiment.

A video processing apparatus 210 includes a frame feature value DB 213 which accumulates the frame feature values to characterize each frame of the video content. The frame feature values are accumulated in the frame feature value DB 213 in correspondence to relation between the scenes constituted by a series of frames of the video content (refer to FIG. 6).

Also, the frame feature value DB 213 stores the frame feature values of each scene which are already inputted and are structured corresponding to relation between the scenes.

The video processing apparatus 210 includes a communication control unit 211 which communicates with each server or the video viewing terminal via a network 270. Further, communication may be wired or may be wireless.

A frame feature value storage unit 212 in the video processing apparatus 210 stores a series of frame feature values of the video content received by the communication control unit 211 in correspondence to a viewer ID (Identification) which identifies the viewer.

A frame feature value comparison unit 214 in the video processing apparatus 210 compares the frame feature values of each scene which are already structured and stored in the frame feature value DB 213 with the frame feature values stored in the frame feature value storage unit 212. And the comparison result of whether or not the frame feature values matched is outputted to a score addition unit 215.

The score addition unit 215 in the video processing apparatus 210 adds, according to the comparison result of the frame feature value comparison unit 214, scores of each scene group which are made to correspond to the viewer ID of a viewer preference DB 216.

Figure 7:
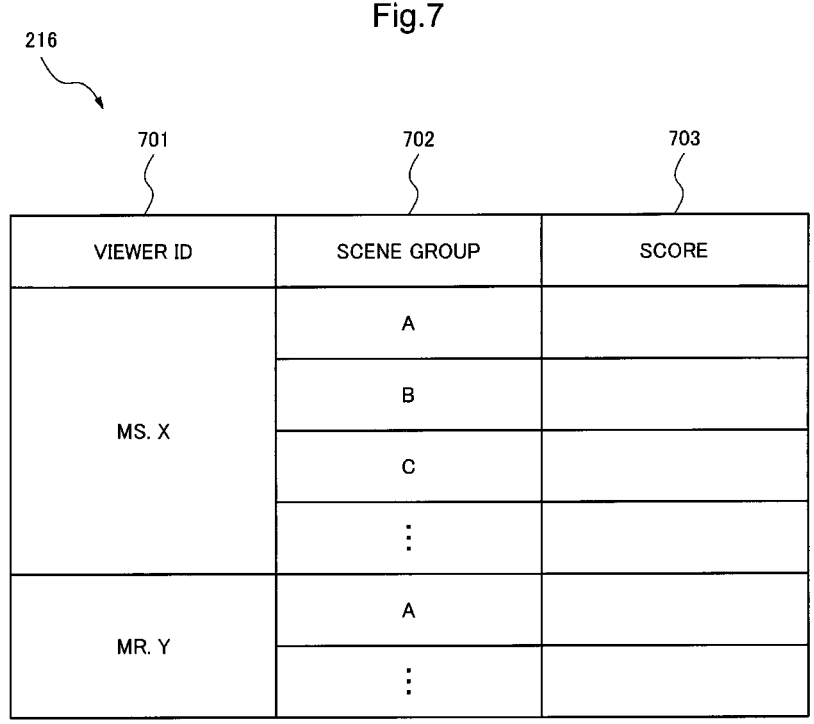
FIG. 7 is a figure showing a structure of a viewer preference DB according to the second exemplary embodiment of the present invention.

The viewer preference DB 216 stores the scores of each scene group in correspondence to the viewer ID (refer to FIG. 7).

A viewer preference determination unit 217 in the video processing apparatus 210 accepts a request from outer device via the communication control unit 211, refers to the viewer preference DB 216 to determine information about preference of the viewer, and notifies the information.

Further, in addition to the determination of the preference of the viewer by the viewer preference determination unit 217, it is also possible to specify information of a video content which matches with the preference of the viewer, and to notify the specified information of the video content.

Movement of transmission of the viewer ID is represented as dashed lines which connect each of the communication control unit 21, the frame feature value storage unit 212, the frame feature value comparison unit 214, the score addition unit 215, the viewer preference DB 216 and the viewer preference determination unit 217 shown in the video processing apparatus 210 of FIG. 2.

Further, the viewer ID is decided, for example, in forms of a terminal specific ID of each of video viewing terminals 220-240 or a login ID to the terminal, or a login ID to a service on the internet which is provided being related to the video processing apparatus 210, and the viewer ID is transmitted to the communication control unit 211.

220 to 240 of FIG. 2 indicate the video viewing terminal for viewing the video content.

The video viewing terminals 220-240 include frame feature value extraction units 220a-240a respectively. In case the video contents are downloaded and viewed from video content distribution servers 250 or 260, the video viewing terminals 220-240 generate the frame feature values using the frame feature value extraction units 220a-240a and send them to the video processing apparatus 210.

Also, in case a video or a recorded video of a broadcast program are reproduced, the video viewing terminals 220-240 generate the frame feature values using the frame feature value extraction units 220a-240a at the time when the video contents are reproduced, and send the frame feature value to the video processing apparatus 210.

Further, reception of the frame feature values of the video content(s) by the video processing apparatus 210 is not limited to the case mentioned above. The frame feature values stored in the video processing apparatus 210 deal with those of the video contents which circulate via all media in the world.

Also, it is desirable that the frame feature value extraction units 220a-240a are manufactured by an IC circuit of a single chip and are mounted on each terminal and the apparatus. Or, when a program for frame feature value extraction is structured to be downloaded to each terminal and the apparatus, loading to the terminal or the apparatus becomes simple and unified processing by the standardized frame feature values becomes possible.

<<Frame Feature Value Extraction Unit>>

FIG. 3A is a block diagram showing a structure of each of frame feature value extraction units 220a-240a according to this exemplary embodiment. The frame feature value extraction units 220a-240a applied in this exemplary embodiment are functional structure units which extract video signatures which are adopted by the standardization of MPEG (Moving Picture Experts Group) 7.

In FIG. 3A, a frame feature value 350 outputted from each of the frame feature value extraction units 220a-240a is one which is generated by quantizing (actually, into three values) and encoding a difference of average brightness values representing region feature values between predetermined regions in each frame image of a photographed video. Here, the predetermined regions mean a large number region pairs which are provided in each frame image of the photographed video and which are different in size or in shape.

A dimension decision unit 310 decides a number of the region pairs. One dimension corresponds to one region pair.

An extraction region acquisition unit 320 acquires the region pair of each dimension for calculating the frame feature value according to the decided number from the dimension decision unit 310.

A region feature value calculation unit 330 includes a first region feature value calculation unit 331 and a second region feature value calculation unit 332. The respective region feature value calculation units calculate average brightness which is one kind of the region feature values of one region in the region pair of each dimension.

A region feature value difference encode unit 340 obtains the difference of the respective average brightness values between the regions in the pair. Further, the region feature value difference encode unit 340 performs quantum coding of the difference according to a third threshold value and outputs the frame feature value 350.

Further, in this example, although explanation will be made in the following by making the average brightness represent the region feature value of the region, the region feature value of the region is not limited to the average brightness and other processing of the brightness or feature values of the frame other than the brightness can also be applied.

FIG. 3B is a figure showing processing in the frame feature value extraction units 220a-240a according to this exemplary embodiment.

300 of FIG. 3B indicates several examples of region pairs which the extraction region acquisition unit 320 of FIG. 3A acquired. In the figure, seven large rectangles show one frame image respectively, and each rectangle inside the frame shows the region.

330a of FIG. 3B is one which expresses relation in one frame image between the regions extracted by the region pair from the extraction region acquisition unit 320 and obtaining the difference between the regions.

A way two regions of the region pair are extracted in one frame image, the average brightness of pixels contained in the respective regions is calculated, and the difference is calculated is shown by arrows which connect centers of each region.

340a of FIG. 3B shows a way how the calculated difference is quantum coded. In 340a, when the difference which subtracted the second region feature value from the first region feature value in FIG. 3A is within the difference which is the third threshold value mentioned above with a difference "0" (corresponds to a case when the average brightness are equal) as a center and which is shown by dashed lines, "0" is generated as an output value of the quantum coding.

When the same difference is a positive (+) value larger than the dashed line position, "+1" is generated as the output value of the quantum coding. When the same difference is a negative (−) value larger than the dashed line position, "−1" is generated as the output value of the quantum coding.

The reason to encode it into three values of "−1", "0" and "+1" in this way is in order to make separation of the frame feature values easy by making it multidimensional as much as possible and at the same time, to reduce amount of calculation of comparison between the frame feature values. Accordingly, it does not need to be limited to the example of three values mentioned above.

Further, the third threshold value shown by the dashed lines is selected from a ratio of the difference values which are quantized to "0" from a distribution of the difference values of all dimensions used. As an example, a value which makes the ratio of the difference values quantized to "0" as 50% is selected.

350a of FIG. 3B shows an example of a generated frame feature value which collected the results of the quantum coding of the differences. The frame feature value is, as a simple example, one which placed the values which are the differences being quantum coded in one-dimensional direction in order of dimension.

Further, not one in which the values which are the differences being quantum coded are simply placed in one-dimensional direction in order of dimension, but one in which they are placed in multidimensional direction or one to which additional calculation is further added is also fine, and not limited to this example.

FIG. 3C is a figure showing the extraction regions in the frame feature value extraction units 220a-240a according to this exemplary embodiment.

320a of FIG. 3B shows an example where the region pair of each dimension is made of two rectangular regions. However, in order to calculate the frame feature value which expresses the frame appropriately, there may be a case where a shape other than the rectangle may be desirable.

The extraction regions shown in FIG. 3C shows examples of which the region pair of each dimension is not made of two rectangular regions.

Further, as shown by 340a of FIG. 3B, by making each dimension ternarized, even in case of realizing comparison of the frame feature values in real time or comparison of frame feature value groups of a video content which are sets of the frame feature values, it is possible to set hundreds of dimensions.

<<Hardware Structure of the Video Processing Apparatus>>

Figure 4:
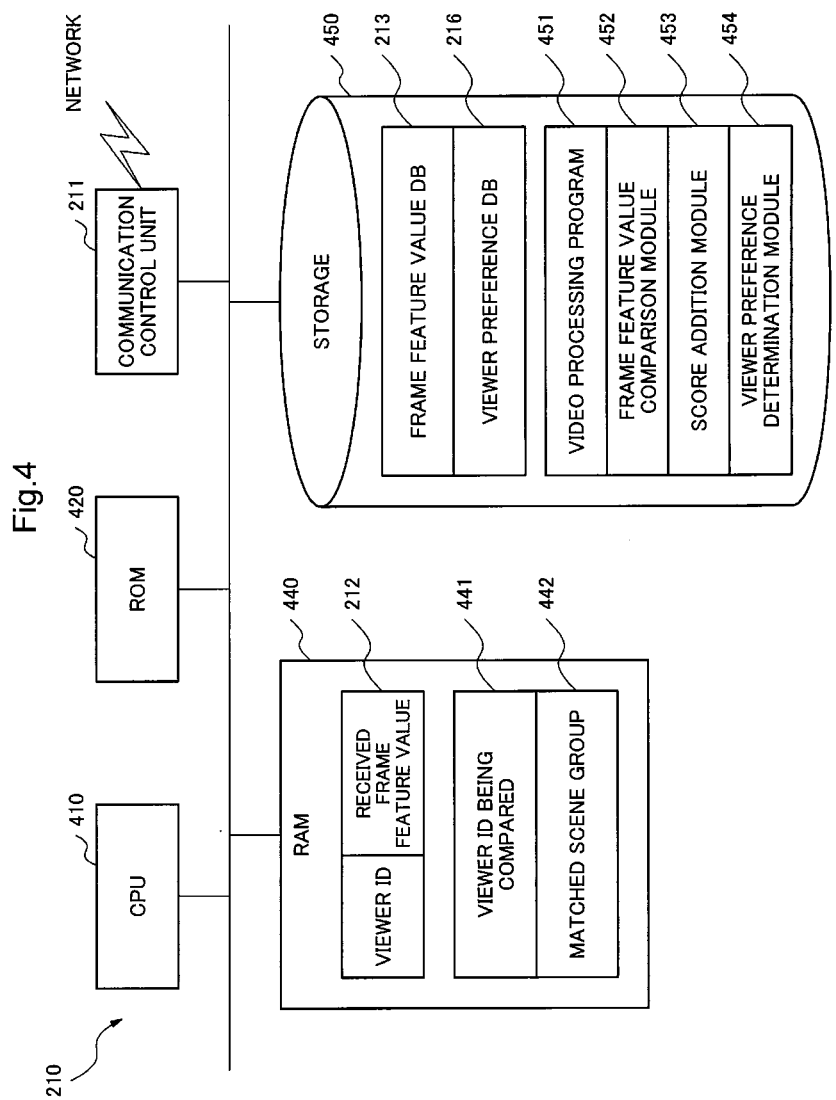
FIG. 4 is a block diagram showing a hardware structure of a video processing apparatus according to the second exemplary embodiment of the present invention.

FIG. 4 is a block diagram showing a hardware structure of the video processing apparatus 210 according to this exemplary embodiment.

In FIG. 4, CPU (Central Processing Unit) 410 is a processor for operation control and, by executing a program, realizes each functional structure unit of FIG. 2.

ROM (Read Only Memory) 420 stores initial data and fixed data of such as a program and a program.

The communication control unit 211 communicates with the video viewing terminals 220-240 or the video content distribution servers 250, 260. Further, the communication may be wireless or may be wired.

RAM (Random Access Memory) 440 is a random access memory which the CPU 410 uses as a work area of temporary storage. In the RAM 440, data areas 212, 441 and 442 which store data necessary to realize this exemplary embodiment are reserved.

Figure 5:
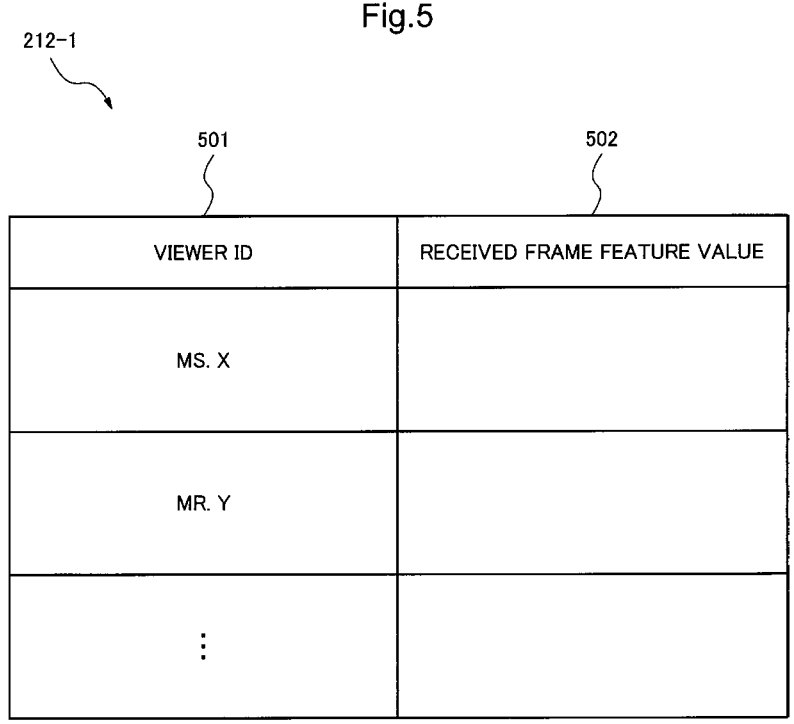
FIG. 5 is a figure showing a structure of a frame feature value storage unit according to the second exemplary embodiment of the present invention.

The data area 212 functions as a frame feature value storage unit which stores a received frame feature value corresponding to the viewer ID (refer to FIG. 5).

The data area 441 stores the viewer ID under comparison of the frame feature values.

The data area 442 stores the matched scene group as a result of comparison of the frame feature values.

A storage 450 stores a database, various parameters, or following data or a program necessary for realization of this exemplary embodiment.

Figure 6:
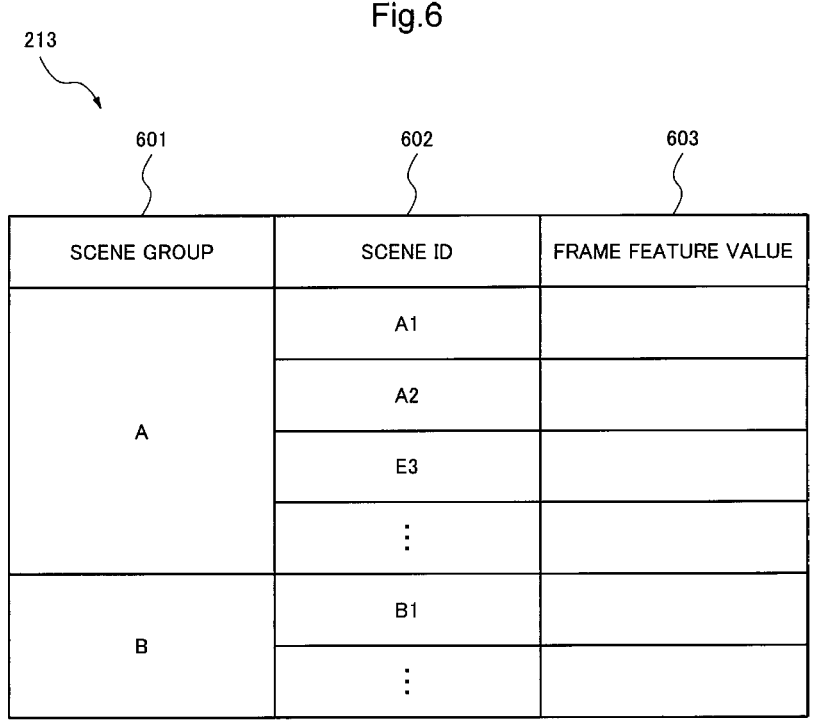
FIG. 6 is a figure showing a structure of a frame feature value DB according to the second exemplary embodiment of the present invention.

The data area 213 functions as a frame feature value DB (refer to FIG. 6).

The data area 216 functions as a viewer preference DB (refer to FIG. 7).

In the storage 450, a program which executes the following processing is stored.

A video processing program 451 executes whole processing.

A frame feature value comparison module 452 processes comparison of frame feature values according to the video processing program 451.

A score addition module 453 adds the scores of the scene groups of the viewer preference DB 216 according to the video processing program 451.

A viewer preference determination module 454 determines the preference of the viewer using accumulated data of the viewer preference DB 216 according to the video processing program 451.

Further, FIG. 4 shows the data and the program necessary for this exemplary embodiment, but it does not illustrate general-purpose data and a program such as OS.

(Received Frame Feature Value)

FIG. 5 is a data structure which shows a structure of a frame feature value storage unit 212-1 according to this exemplary embodiment. Further, in order to distinguish it from a frame feature value storage unit 212-2 in the third exemplary embodiment which is mentioned later, it is described as the frame feature value storage unit 212-1 in this exemplary embodiment.

The frame feature value storage unit 212-1 stores received frame feature values 502 which are made to correspond to viewer IDs 501. Thus, the frame features are sent respectively from the terminals outputting the videos which the viewers are viewing, the frame feature value storage unit 212-1 classifies the frame feature values by the viewer ID and stores them.

Further, since capacity of the received frame feature values is enough if it is secured to a degree such that there will be no reception error due to the received data amount, it can be realized with smaller storage capacity compared with storing the video data.

(Frame Feature Value DB)

FIG. 6 shows a data structure of the frame feature value DB 213 according to this exemplary embodiment.

The frame feature value DB 213 accumulates scene IDs 602 contained in a scene group 601 and a series of frame feature values 603 corresponding to each scene ID. The frame feature values 603 are compared with the received frame feature value, and it will be known to which scene group the received frame feature value belongs.

Further, the scene group may purely collect scenes of which difference values of a series of frame feature values are within a predetermined range or may collect scenes of which contents of the video content, a genre or a theme dealt with, or a person or a subject who appears in the video are identical or related each other.

Or a certain identical scene may be registered within a plurality of scene groups. For example, a case where a scene which is contained in a scene group which collected scenes in which a specific person appears is contained in a different scene group which collected scenes which are photographed at a specific photographing location and so on will be contained.

Further, the structure of the frame feature value DB 213 is not limited to the structure of FIG. 6, and other necessary items may be added.

(Viewer Preference DB)

FIG. 7 is a data structure which shows a structure of the viewer preference DB 216 according to this exemplary embodiment.

The viewer preference DB 216 stores respective scores 703 in correspondence to a plurality of scene groups 702. The plurality of scene groups 702 are specified by comparing, in correspondence to a viewer ID 701, the frame feature values of each scene received so far and the frame feature values of the frame feature value DB 213.

This score is added when the frame feature values by viewing of the video content by the viewer are received. As a result, a scene group of which the score is larger than a predetermined threshold value will be a scene which the viewer prefers.

Further, by making the scene group correspond to a group of the video content, or a character or an object in the video, it becomes possible to determine such as the video content or the character preferred from the scene group which the viewer prefers.

Further, when the scene groups corresponding to each viewer ID are increased unlimitedly, since capacity of the viewer preference DB 216 continues to grow, it is desirable that processing such as the scene groups of which the score is smaller than a predetermined threshold value will be deleted after a fixed period has passed will be executed.

<<Processing Procedure of the Video Processing Apparatus>>

Figure 8:
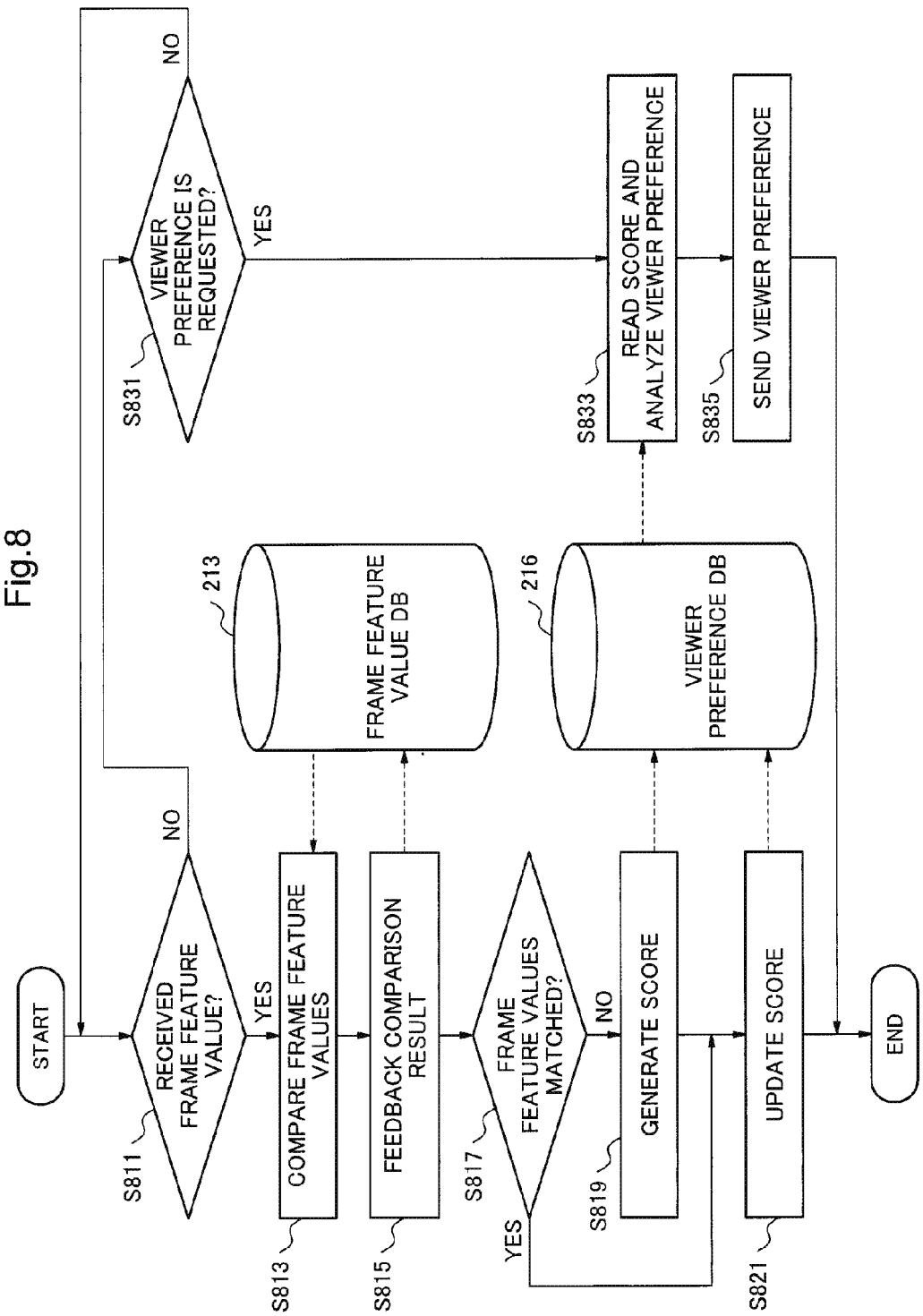
FIG. 8 is a flow chart showing a processing procedure of the video processing apparatus according to the second exemplary embodiment of the present invention.

FIG. 8 is a flow chart showing a processing procedure of the video processing apparatus 210 according to this exemplary embodiment. Operations which this flow chart shows are realized using each functional structure unit shown in FIG. 2. Also, the operations are executed by the CPU 410 of FIG. 4 by using the RAM 440.

First, the video processing apparatus 210 determines whether or not a frame feature value is received (Step S811). When the video processing apparatus 210 receives the frame feature value, the frame feature value comparison unit 214 in the video processing apparatus 210 compares the received frame feature value with the frame feature values stored in the frame feature value DB 213 (Step S813). Next, the frame feature value comparison unit 214 feeds back the comparison result to the frame feature value DB 213. For example, when the received frame feature value matches with a frame feature value of either of the scene groups, the received frame feature value is added to the scene group (Step S815).

On the other hand, when there are no matched scene groups, a new scene group will be generated. Since such a scene group generated newly is a group which deviates from the classification of preference so far, new preference will be formed as accumulation to the frame feature value DB 213 advances.

The video processing apparatus 210 changes processing after that according to whether or not there exists matching of the frame feature values (Step S817).

In case there is no matching of the frame feature values, the scene group generated newly is added to the viewer ID in the viewer preference DB 216, a new score is generated, and addition of the score will start (Step S819).

In case there is matching of the frame feature values, the score about the matched scene group is updated (increased) (Step S821).

On the other hand, the video processing apparatus 210 determines whether or not there is a request of viewer preference information (Step S831). When there is the request of viewer preference information, in the video processing apparatus 210, the viewer preference determination unit 217 reads the score about the desired viewer ID from the viewer preference DB 216, and analyzes the viewer preference on the basis of the score (Step S833). Analyzed viewer preference or the score itself is sent to a requester via the communication control unit 211 (Step S835).

The Third Exemplary Embodiment

Next, a video processing system according to the third exemplary embodiment of the present invention will be explained.

The video processing system according to this exemplary embodiment is an example in which, when the scores of the second exemplary embodiment are updated, corresponding to operation of the viewer or reaction to a video or a scene, the values are weighted. The third exemplary embodiment can analyze a preference level more accurately compared with the second exemplary embodiment.

Further, in this exemplary embodiment, information about weighting of score update and timing of the weighting in a processing procedure will be explained mainly, and as for the similar structure and operation as the second exemplary embodiment, their explanation will be omitted.

(Received Frame Feature Value)

FIG. 9 is a block diagram showing a structure of the frame feature value storage unit 212-2 according to this exemplary embodiment.

In addition to the frame feature values explained in the second exemplary embodiment, the frame feature value storage unit 212-2 receives and stores other information related to the weighting from the viewer or the video viewing terminal.

The frame feature value storage unit 212-2 stores in correspondence to viewer IDs 901 and in addition to frame feature values 902, broadcast/reproduction 903, reproduction systems 904, reactions 905 of the viewer, and weighted total amounts 906 of the results. Further, parameters of the weighting are not limited to FIG. 9.

The broadcast/reproduction 903 is information of whether the video is a direct broadcast or whether it is reproduction. As for the direct broadcast, there is a possibility that the viewer may not be viewing the broadcast. On the other hand, as for the reproduction, it can be considered that the viewer is reproducing and viewing with consciousness. Accordingly, as for the weighting, the weight for the reproduction is made larger than the broadcast.

The reproduction system 904 is also one which follows the broadcast/reproduction 903 and makes the weight of the reproduction from a storage medium larger than the weight of the reproduction of a recorded video program.

The reaction 905 has a plus reaction (affirmative reaction) and a minus reaction (negative reaction) of the viewer. The reaction may be received by a voice or a key input directly, or may be judged from operation of the viewer. For example, in case of fast-forwarding, it becomes minus, in case of being repeated, it becomes plus.

(Weight Setting Table)

Figure 10:
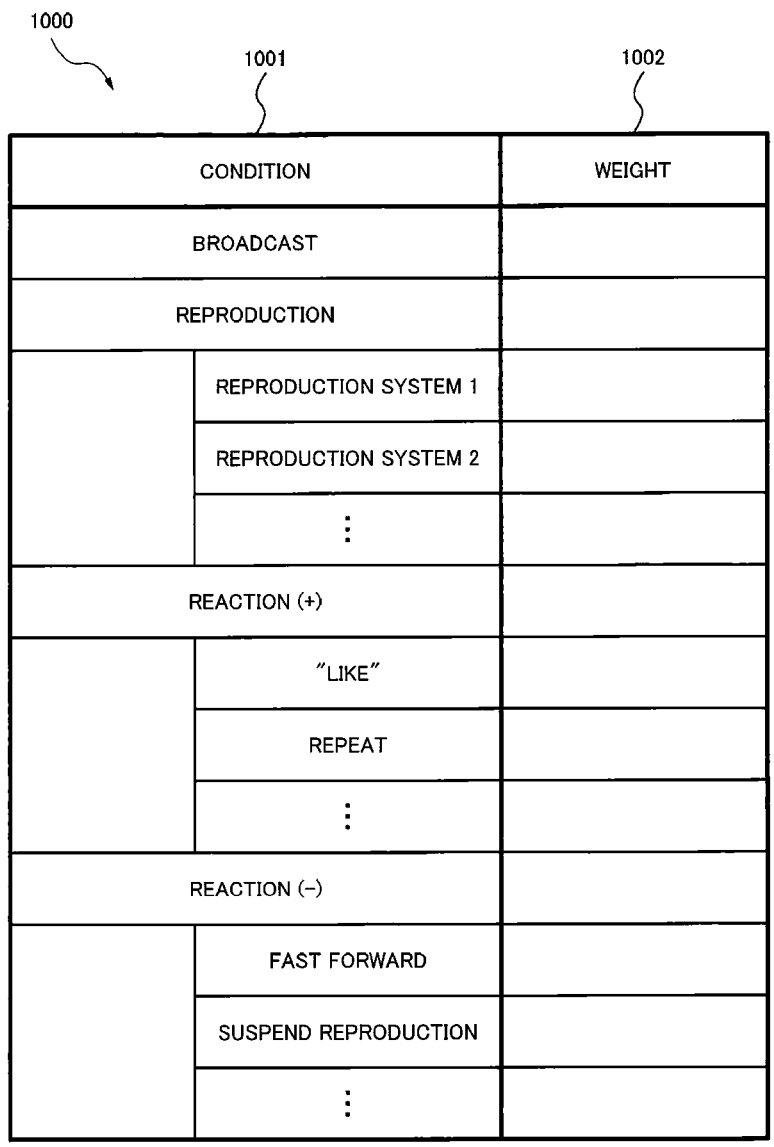
FIG. 10 is a figure showing a structure of a weight setting table according to the third exemplary embodiment of the present invention.

FIG. 10 is a figure showing a data structure of a weight setting table 1000 according to this exemplary embodiment.

The weight setting table 1000 is a table which defines setting of each weight shown in FIG. 9. As described in the weight setting table 1000 of FIG. 9, numerical values of weight 1002 are stored in correspondence to a condition 1001 of each weighting. The numerical values may be numerical values of plus/minus or may be numerical values of no smaller than 1/no more than 1 which are to be multiplied. Further, the items of the condition of FIG. 10 are just several example, and are not limited to those.

<<Processing Procedure of the Video Processing Apparatus>>

Figure 11:
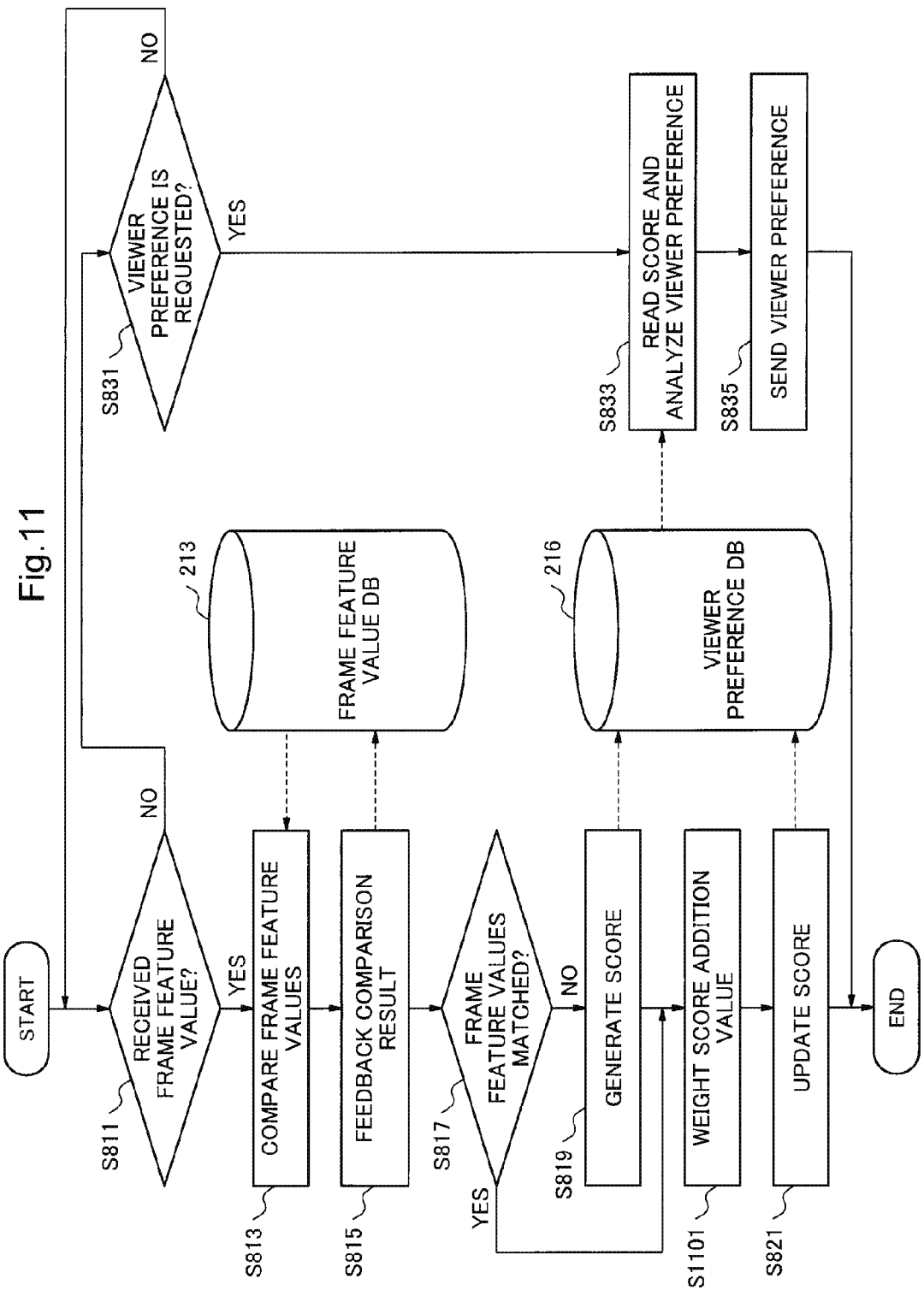
FIG. 11 is a flow chart showing a processing procedure of a video processing apparatus according to the third exemplary embodiment of the present invention.

FIG. 11 is a flow chart showing a processing procedure of the video processing apparatus according to this exemplary embodiment. Operations which this flow chart shows are realized using each functional structure unit shown in FIG. 2. Also, the operations are executed by the CPU 410 by using the RAM 440 with a structure which added the weight setting table 1000 to the storage 450 of FIG. 4 shown in the second exemplary embodiment.

The flow chart of FIG. 11 is similar to FIG. 8 except for a step of weighting. Accordingly, the step for weighting will be explained mainly, and the same steps as FIG. 8 are attached the same number and their explanation will be omitted.

This exemplary embodiment weights, before update of the score (Step S821), added values of the score (Step S1101).

The Fourth Exemplary Embodiment

Next, a video processing system according to the fourth exemplary embodiment of the present invention will be explained The video processing system according to this exemplary embodiment is different, compared with the second and the third exemplary embodiments mentioned above, in a point that the frame feature values stored in the frame feature value DB are not the frame feature values of the whole scene but of its selected part.

The selected part may be a first part, a latter part or a middle part representing characteristics of each scene and its length may also be changed.

The fourth exemplary embodiment can reduce the storage capacity of the frame feature value DB substantially compared with the second exemplary embodiment. Further, in this exemplary embodiment, the structure of the frame feature value DB will be explained mainly, and as for the similar structure and operation as the second or the third exemplary embodiment, their explanation will be omitted.

(Frame Feature Value DB)

Figure 12:
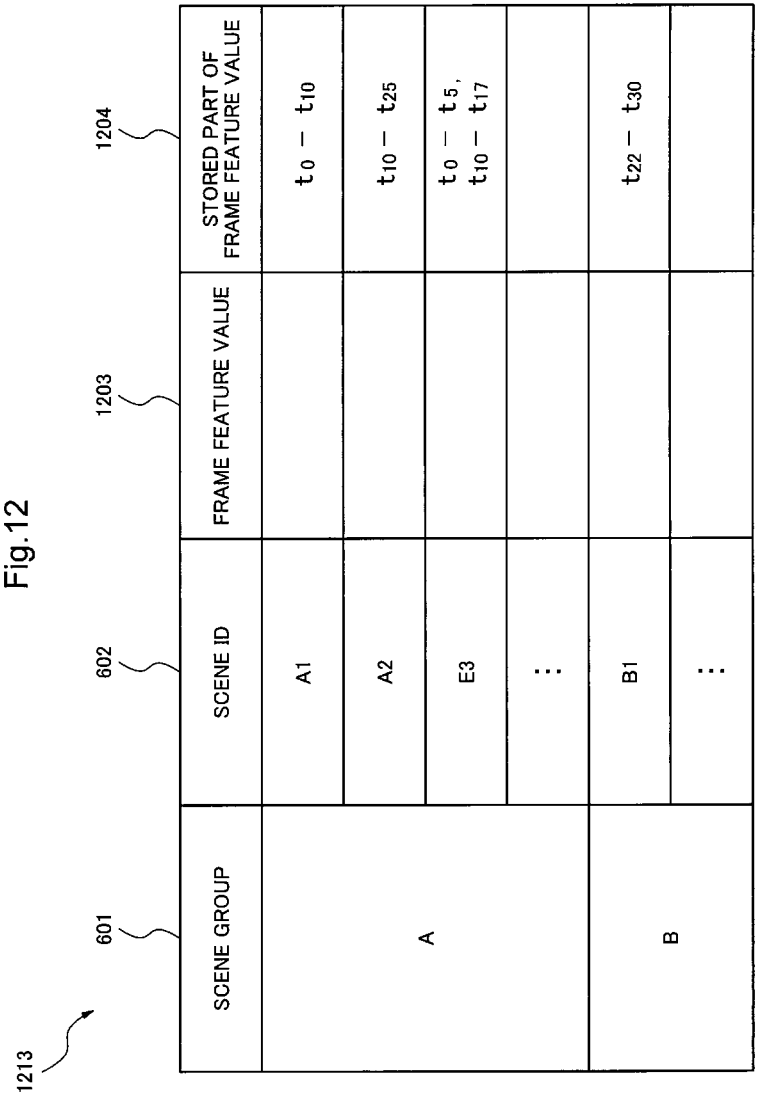
FIG. 12 is a figure showing a structure of a frame feature value DB according to a fourth exemplary embodiment of the present invention.

FIG. 12 is a figure showing a structure of a frame feature value DB 1213 according to this exemplary embodiment. Further, in this exemplary embodiment, the frame feature value DB 1213 replaces the frame feature value DB 213 of FIG. 2 and FIG. 4 in the second exemplary embodiment.

The frame feature value DB 1213 stores the frame feature values in correspondence to the similar scene groups 601 and the scene IDs 602 as FIG. 6. However, what is stored are frame feature values 1203 of the scenes designated by stored part of frame feature values 1204.

Here, the stored part of frame feature value 1204 is a number of seconds from when the scene started (t0 represents 0 second and t10 represents 10 seconds). In an example of FIG. 12, although each scene is explained to be 30 seconds, duration of the scenes may be variable. For example, in the example of FIG. 12, for a scene of the scene ID of A1, frame feature values for the first 10 seconds are stored. Also, for a scene of the scene ID of A2, frame feature values for from 10 second to 25 second in the middle are stored. Also, for a scene of the scene ID of E3, frame feature values for first 5 seconds and for from 10 second to 27 second in the middle are stored. Also, for a scene of the scene ID of B1, frame feature values for last 8 seconds are stored.

Further, in FIG. 12, although the stored part of frame feature value 1204 is expressed in the number of seconds from the start, it may be stored in frame numbers which are serial numbers assigned from the start such as from one hundredth frame to two hundred and fiftieth frame.

The Fifth Exemplary Embodiment

Next, a video processing system according to the fifth exemplary embodiment of the present invention will be explained.

The video processing system according to this exemplary embodiment is different, compared with the second to the fourth exemplary embodiments mentioned above, in a point that a subject DB which stores identifiers of such as tags which show subjects of the scene in a searchable way is further provided and preference of the viewer is determined from a plurality of viewpoints.

The subjects of the scene are persons such as performers of a program, creatures such as insects or mountains, sea, or buildings. This exemplary embodiment can determine the preference of the viewer by, in addition to the frame feature values of the scene which are characteristics which the image data has, the subjects contained in part of the scene. For example, a scene in which the subject of target appears instantly or a scene in which the subject appears in part of a scenery (for example, an image of a television or a painting in the frame) and so on can be considered.

In the following, a part in which this exemplary embodiment is different from the second to the fourth exemplary embodiments mentioned above will be explained, and as for the similar structure and operation as the second to fourth exemplary embodiments, their explanation will be omitted.

This exemplary embodiment is an example which provided the scene groups by matching of the frame feature values and the scene groups by matching of the subject IDs separately. However, it is possible to combine the scenes of which the frame feature values match and the scenes of which the subjects match as one scene group, and preference of the viewer which merged two viewpoints further can become possible. Further, in order to judge the preference of the viewer, it is possible to assign different weights to the matching of frame feature values and to the matching of the subject IDs.

<<Structure of the Video Processing System>>

Figure 13:
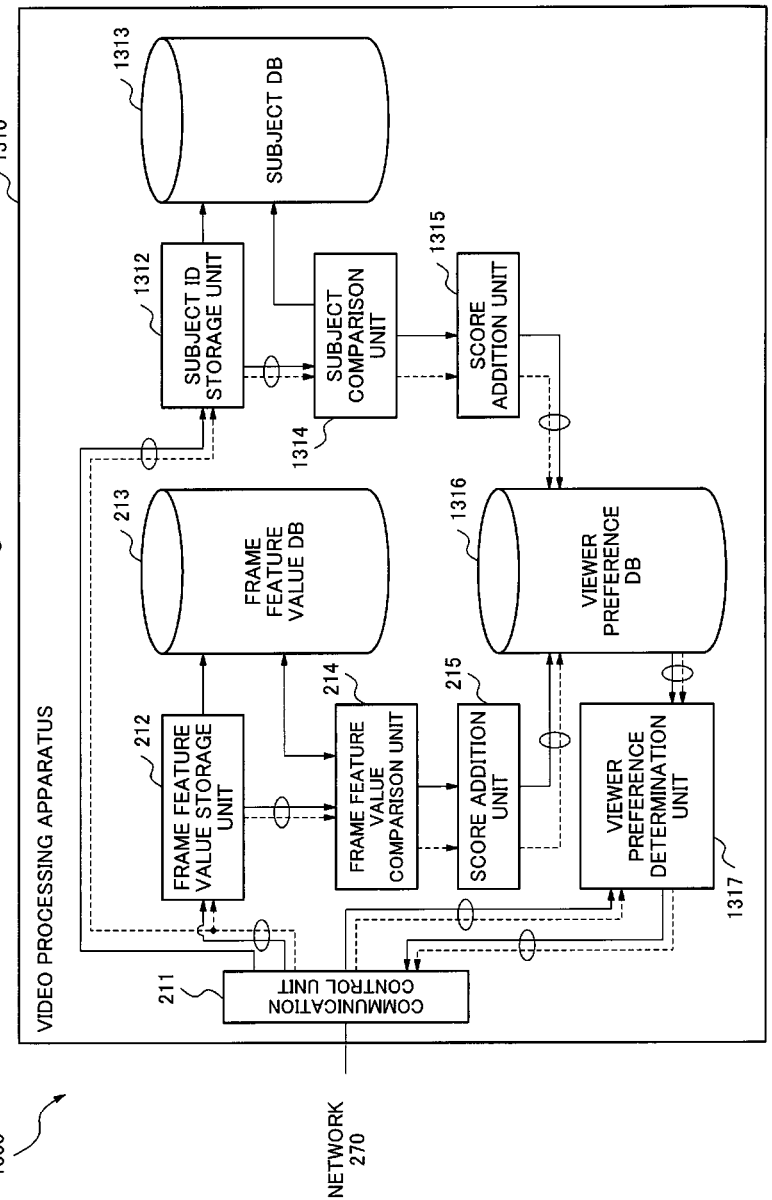
FIG. 13 is a block diagram showing a structure of a video processing system according to a fifth exemplary embodiment of the present invention.

FIG. 13 is a block diagram showing a structure of a video processing system 1300 according to this exemplary embodiment. Further, FIG. 13 is a figure for explaining the video processing apparatus, and equipment which is connected to the network 270 is omitted. Also, the same reference numbers are attached to the same functional structure units as the second exemplary embodiment. In the following, a point of difference with the second exemplary embodiment will be explained.

A subject ID storage unit 1312 stores the subject IDs of the video being reproduced which the communication control unit 211 received and which is from the terminal for viewing. Further, the subject ID may be one which corresponds to the scene which the frame feature value shows or may be one which corresponding to the whole content.

In the following, a case where this exemplary embodiment is the subject ID corresponding to the scenes which the frame feature value received simultaneously will be explained.

A subject DB 1313 stores a plurality of scenes containing a video of the same subject as a scene group (refer to FIG. 14).

A subject comparing unit 1314 compares the subject IDs which the subject ID storage unit 1312 stores and which are received from the video viewing terminal, with the subject IDs which are stored in the subject DB 1313.

A score addition unit 1315 adds the score about the scene in case the subject IDs match.

A viewer preference DB 1316 accumulates the scores of the scene groups by matching of the subject IDs separate from the scores of the scene groups by matching of the frame feature values in the viewer preference DB 216 of the second exemplary embodiment (refer to FIG. 15).

(Subject DB)

FIG. 14 is a figure showing a structure of the subject DB 1313 according to this exemplary embodiment.

The subject DB 1313 stores scene IDs 1402 contained in a scene group 1401 and subject IDs 1403 corresponding to each scene ID. The subject comparing unit 1314 compares the subject IDs 1403 in the subject DB 1313 with the received subject ID. By this comparison, it will be known to which scene group the received subject ID belongs. Further, a structure of the subject DB 1313 is not limited to the structure of FIG. 14, and other necessary items may be added.

(Viewer Preference DB)

FIG. 15 is a figure showing a structure of the viewer preference DB 1316 according to this exemplary embodiment.

The viewer preference DB 1316 stores respective attributes 1503 and scores 1504 in correspondence to the frame feature values of the video which a viewer ID 1501 viewed or a plurality of scene groups 1502 to which the subject ID belongs. Upon receipt of the frame feature values by the viewer viewing the video content, and/or, by the subject of the video content of the viewer, the scores are added. As a result, the scene group of which this score is large will be the scene which the viewer prefers.

Further, when the scene groups corresponding to each viewer ID are increased unlimitedly, capacity of the viewer preference DB 216 continues to grow. For this reason, it is desirable that processing such as the scene groups of which the score is small will be deleted after a fixed period has passed will be executed.

<<Processing Procedure of the Video Processing Apparatus>>

Figure 16:
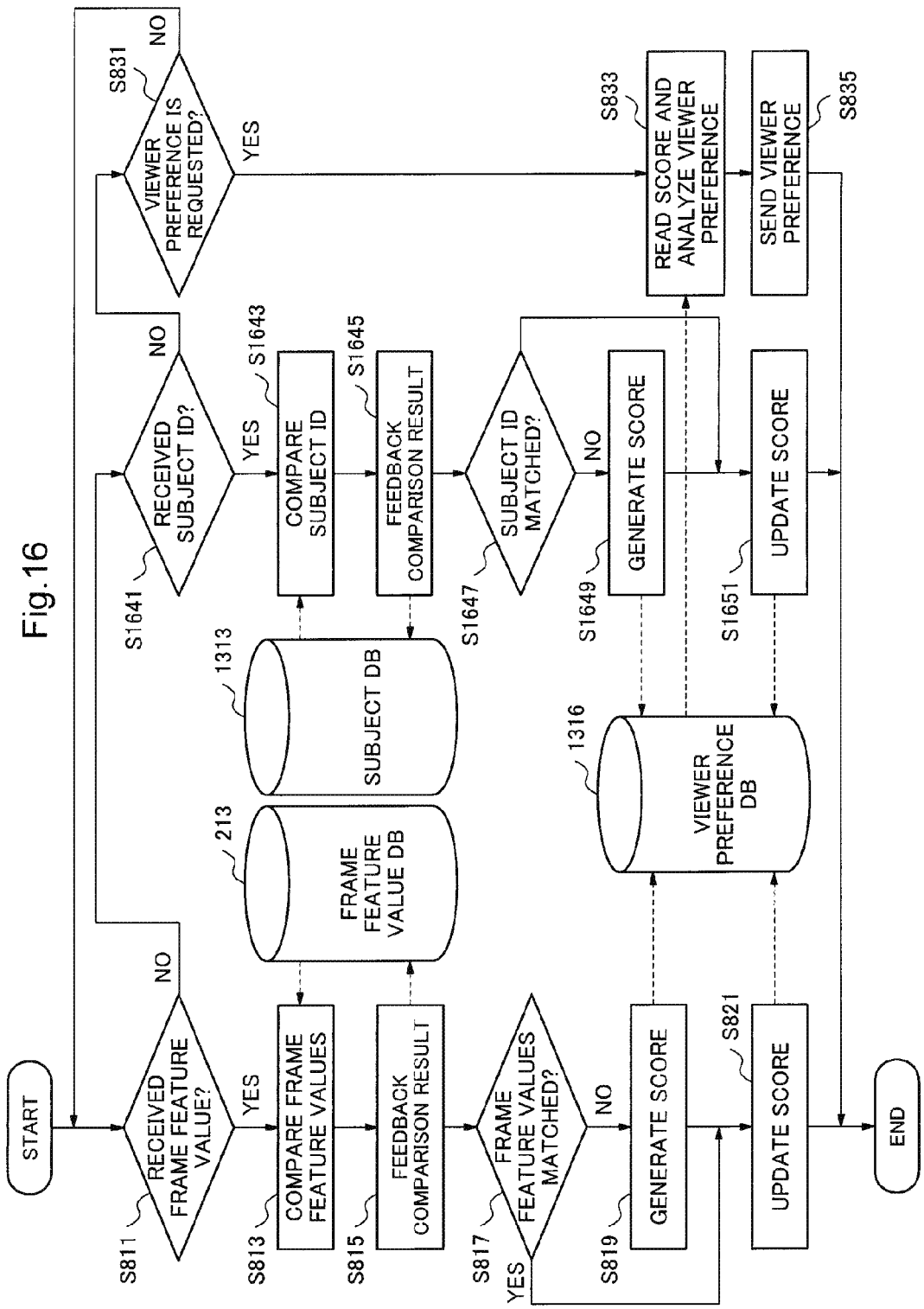
FIG. 16 is a flow chart showing a processing procedure of a video processing apparatus according to the fifth exemplary embodiment of the present invention.

FIG. 16 is a flow chart showing a processing procedure of a video processing apparatus 1310 according to this exemplary embodiment. Operations which this flow chart shows are realized using each functional structure unit shown in FIG. 13. Also the operations are executed by the CPU 410 by using the RAM 440 with a structure which added the subject DB 1313 to the storage 450 of FIG. 4 shown in the second exemplary embodiment.

Further, in FIG. 16, the similar procedures as FIG. 8 of the second exemplary embodiment are attached the same reference number and their explanation will be omitted. A characteristic part of this exemplary embodiment is a part of Steps S1641 to S1651.

First, the video processing apparatus 1310 determines whether or not the subject ID is received (Step S1641).

Next, when the video processing apparatus 1310 receives the subject ID, the subject comparing unit 1314 in the video processing apparatus 1310 compares the received subject ID with the subject IDs stored in the subject DB 1313 (Step S1643). Next, the subject comparing unit 1314 feeds back the comparison result to the subject DB 1313 (Step S1645). For example, when the received subject ID matches with the subject ID of either scene group stored in the subject DB, the subject comparing unit 1314 adds the received subject ID to the scene group. On the other hand, when there are no matching scene groups, the subject comparing unit 1314 generates a new scene group.

The video processing apparatus 1300 performs different processing on the basis of whether or not there was matching between the received subject ID and the subject IDs stored in the subject DB 1313 (Step S1647).

In case the subject IDs do not match, the score addition unit 1315 adds the scene group generated newly to the viewer ID in the viewer preference DB 1316, and starts to add the new score (Step S1649).

In case the subject IDs match, the score addition unit 1315 updates (increases) the score about the matched scene groups (Step S1651).

The Sixth Exemplary Embodiment

Next, a video processing system according to the sixth exemplary embodiment of the present invention will be explained. The video processing system according to this exemplary embodiment is different, compared with the fifth exemplary embodiment mentioned above, in a point that the frame feature value DB and the subject DB are united and the preference of the viewer is determined by making a plurality of viewpoints correspond.

This exemplary embodiment can judge more detailed or more delicate preference of the viewer which cannot be judged by matching of the frame feature values. Further, in the explanation of this exemplary embodiment below, explanation of the similar structure and operation as the second to the fifth exemplary embodiments will be omitted, and a part different from the second to the fifth exemplary embodiment will be explained.

Also, in this exemplary embodiment, as a method to determine by making a plurality of viewpoints correspond, although a scene group is defined by matching of the frame feature values, and amount of increase of the score is decided by whether or not the subject IDs match, the method to determine by making the plurality of viewpoints correspond is not limited to this.

Conversely, the scene group may be defined by matching of the subject IDs, and the amount of increase of the score may be decided by whether or not the frame feature values match. Also, in case both of them match, the score may be increased.

<<Structure of the Video Processing System>>

Figure 17:
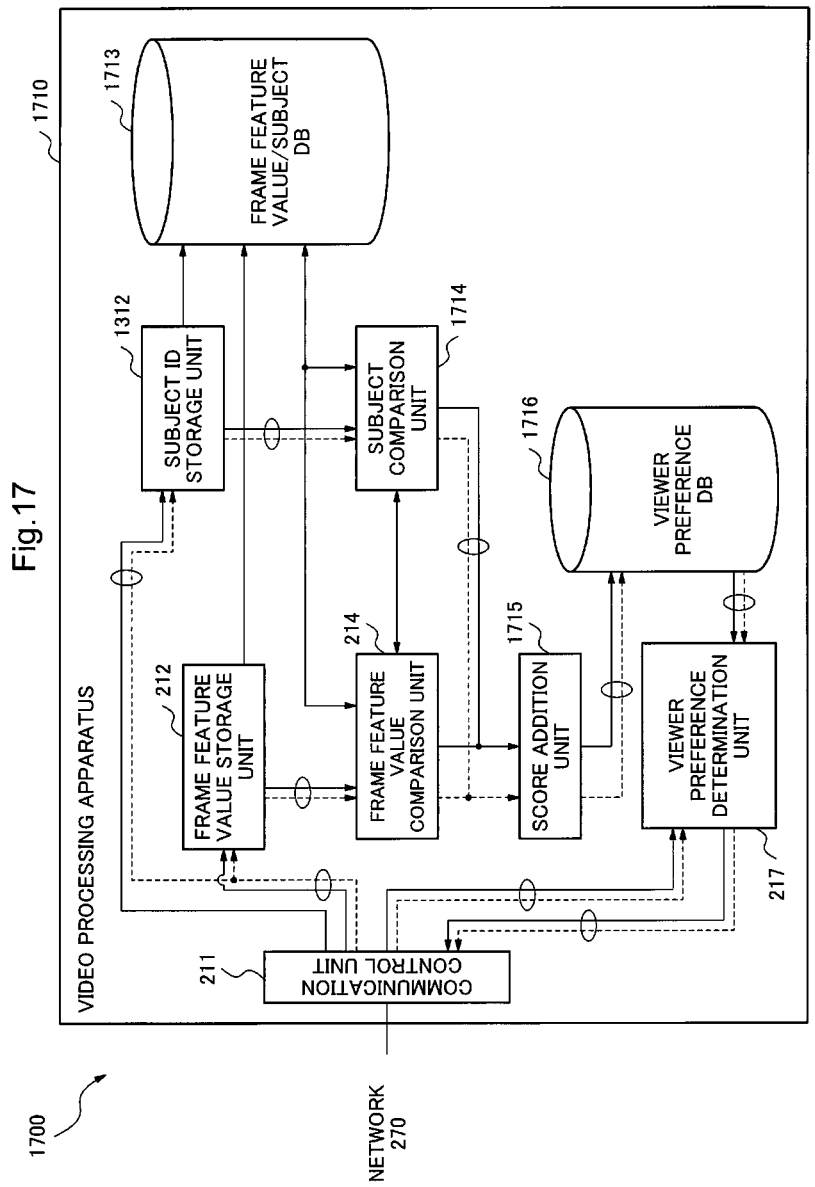
FIG. 17 is a block diagram showing a structure of a video processing system according to a sixth exemplary embodiment of the present invention.

FIG. 17 is a block diagram showing a structure of a video processing system 1700 according to this exemplary embodiment. Further, FIG. 17 is a figure for explaining the video processing apparatus, and equipment which is connected to the network 270 is omitted. Further, the same reference numbers are attached to the same functional structure units as the second exemplary embodiment. In the following, a point of difference with the second exemplary embodiment will be explained.

A subject ID storage unit 1712 stores the subject IDs of the video being reproduced which the communication control unit 211 received and which is from the video viewing terminal. Further, the subject IDs are ones which correspond to the scene which the frame feature value shows.

A frame feature value/subject DB 1713 stores derived frame feature values and at the same time, stores a plurality of scenes containing the video of the same subject as the scene group (refer to FIG. 18).

A subject comparing unit 1714 compares the subject ID which the subject ID storage unit 1712 stores and which are received from the video viewing terminal, with the subject IDs stored in the frame feature value/subject DB 1713.

In case the compared frame feature values match, a score addition unit 1715 adds the score about the scene corresponding to whether or not the subject IDs match.

A viewer preference DB 1716 accumulates, different from the separate scores of the scene groups by matching of the frame feature values and by matching of the subject IDs in the viewer preference DB 1316 of the fourth exemplary embodiment, the scores of the scene groups which are counted, in case the compared frame feature values match, corresponding to whether or not the subject IDs match.

Further, although the viewer preference DB 1716 is different in the condition for counting, the structure is similar to FIG. 7 of the second exemplary embodiment, and its explanation will be omitted.

(Frame Feature Value/Subject DB)

FIG. 18 is a figure showing a structure of the frame feature value/subject DB 1713 according to this exemplary embodiment.

The frame feature value/subject DB 1713 stores scene IDs 1802 contained in a scene group 1801, frame feature values 1803 and subject IDs 1804 corresponding to each scene ID. The subject comparing unit 214 compares the frame feature values 1803 of the frame feature value/subject DB 1713 with the received frame feature value. By this comparison, it will be known to which scene group the received frame feature value belongs.

And the subject comparing unit 1714 compares the subject IDs 1804 stored in the frame feature value/subject DB 1713 with the received subject ID, and decides the amount of increase of the score about the scene group by whether or not the subject IDs match. Further, a data structure of the frame feature value/subject DB 1713 is not limited to the structure of FIG. 18, and other necessary items may be added.

<<Processing Procedure of the Video Processing Apparatus>>

Figure 19:
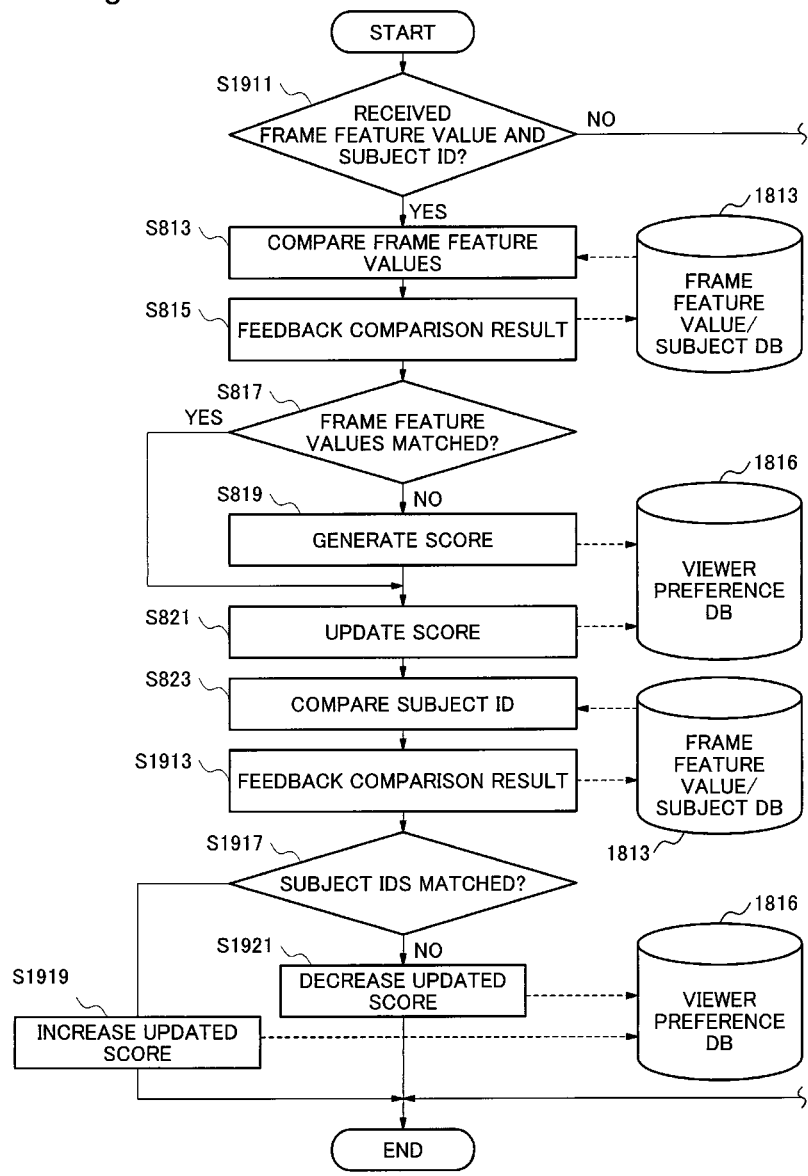
FIG. 19 is a flow chart showing a processing procedure of a video processing apparatus according to the sixth exemplary embodiment of the present invention.

FIG. 19 is a flow chart showing a processing procedure of a video processing apparatus 1710 according to this exemplary embodiment. Operations which this flow chart shows are realized using each functional structure unit shown in FIG. 17. Also the operations are executed by the CPU 410 by using the RAM 440 with a structure which added the frame feature value/subject DB 1713 to the storage 450 of FIG. 4 shown in the second exemplary embodiment.

Further, FIG. 19 is a modification of Steps S811-S821 of FIG. 8, and the similar steps as FIG. 8 are attached the same reference numbers, and their explanation will be omitted. Also, since it is similar for Steps S831-S835, explanation will be omitted.

The video processing apparatus 1710 determines whether or not the frame feature value and the subject ID from the terminal for viewing are received (Step S1911).

Next, when the frame feature value and the subject ID are received, the video processing apparatus 1710 performs the similar processing as FIG. 8 from comparison of the frame feature values (Step S813) to score generation or score update on the basis of the comparison result (Step S821). However, the frame feature value/subject DB is used instead of the frame feature value DB of FIG. 8.

Next, the subject comparing unit 1714 compares the received subject ID with the subject IDs stored in the frame feature value/subject DB 1813 (Step S1913). The comparison result is fed back to the frame feature value/subject DB 1813 (Step S1915). For example, when it matches with the subject ID of either scene group, the subject comparing unit 1714 adds the received subject ID to the scene group. On the other hand, when there are no matching scene groups, the subject comparing unit 1714 generates a new scene group.

The video processing apparatus 1710 performs different processing on the basis of whether or not there was matching between the received subject ID and the subject IDs which are stored in the frame feature value/subject DB 1713 (Step S1917).

In case the subject IDs do not match, the score addition unit 1715 decreases the score updated in Step S821 (Step S1921).

On the other hand, in case the subject IDs match, the score updated in Step S821 is increased (Step S1919).

Thus, when the frame feature values match and at the same time, the subject IDs match, the score increases further, and on the other hand, even when the frame feature values match, when the subject IDs do not match, the score decreases.

The Seventh Exemplary Embodiment

Next, a video processing system according to the seventh exemplary embodiment of the present invention will be explained. To the video processing system according to this exemplary embodiment, compared with the second to the sixth exemplary embodiments mentioned above, a point is added which, on the basis of the preference of the viewer recognized from the frame feature values of the video which is from the video viewing terminal and which is being reproduced and/or a viewing history of the past, notifies the viewer of the content which the viewer has not viewed yet.

This exemplary embodiment can, upon judgment of the preference of the viewer, notify/introduce the content which is not viewed by the viewer. Further, in the explanation of this exemplary embodiment below, the explanation about the similar structure and operation as the second to the sixth exemplary embodiments will be omitted, and a part different from the second to the sixth exemplary embodiments will be explained.

<<Structure of the Video Processing System>>

Figure 20:
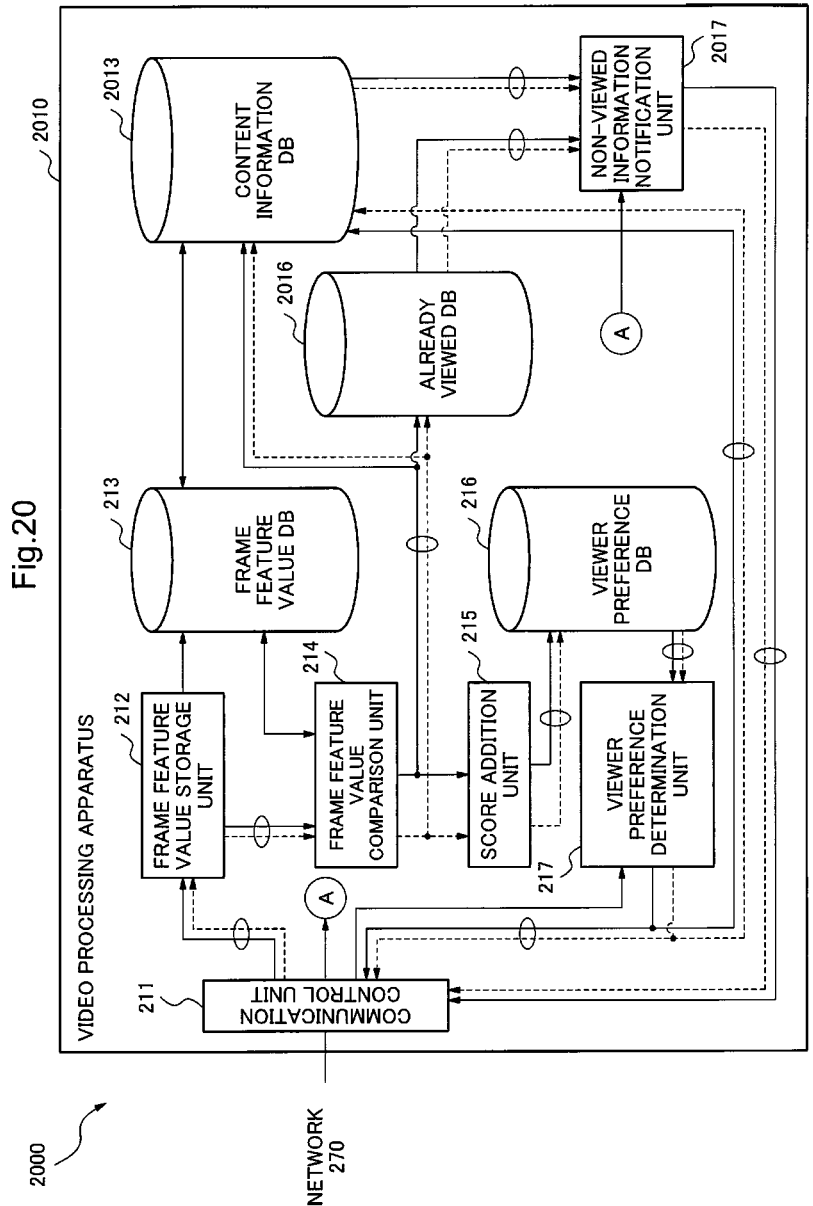
FIG. 20 is a block diagram showing a part of a structure of a video processing system according to a seventh exemplary embodiment of the present invention.

FIG. 20 is a block diagram showing a part of a structure of a video processing system 2000 according to this exemplary embodiment. Further, FIG. 20 is a figure for explaining a video processing apparatus 2010, and equipment which is connected to the network 270 is omitted. Also, the same reference numbers are attached to the same functional structure units as the second exemplary embodiment. In the following, a point of difference with the second exemplary embodiment will be explained.

A content information DB 2013 in the video processing apparatus 2010 accumulates content information containing the frame feature values accumulated in the frame feature value DB 213. Further, an example of the content information will be data of the content itself or a content ID which is an identifier which identifies the content (refer to FIG. 21).

An already viewed DB 2016 accumulates already viewed content IDs which are already viewed in correspondence to the viewer ID which identifies the viewer. Further, in addition to the contents which the viewer viewed, the contents which are not viewed but held, or the contents which one's family or one's friend owns may be accumulated in the already viewed DB 2016 as the contents which can be viewed easily.

A not-viewed information notification unit 2017 notifies the viewer of candidates of the contents except for the contents accumulated in the already viewed DB 2016 among notification candidate content groups. The not-viewed information notification unit 2017 searches the notification candidate content groups from the content information DB 2013 on the basis of the preference of the viewer recognized from the frame feature values of the video which is being reproduced and/or the viewing history of the past.

Further, in this exemplary embodiment, although an example which makes the derived contents judged by the frame feature values of the video being reproduced or the contents on the basis of the viewer preference as the notification candidate contents is shown, other conditions for searching the notification candidate contents may also be contained. That is, by the notification by the not-viewed information notification unit 2017, it becomes possible to obtain effects of advertisement which enhances buying intention of the viewer.

(Content Information DB)

Figure 21:
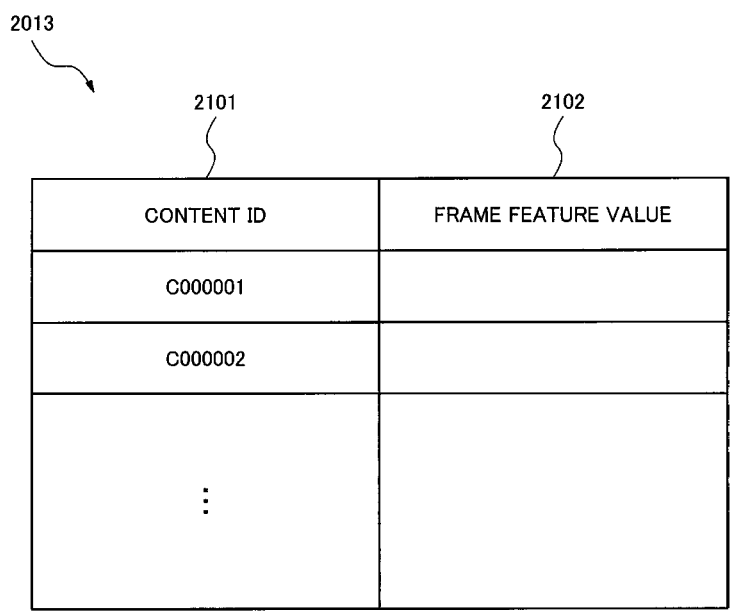
FIG. 21 is a figure showing a structure of a content information DB according to the seventh exemplary embodiment of the present invention.

FIG. 21 is a figure showing a structure of the content information DB 2013 according to this exemplary embodiment.

The content information DB 2013 accumulates content IDs 2101 by being linked to frame feature values 2102. The content information DB 2013 concerned accumulates the content information which was reproduced by the terminal for viewing and the frame feature values were sent in the past or the content information of which the frame feature values were sent from such as the video content distribution servers.

(Already Viewed DB)

Figure 22:
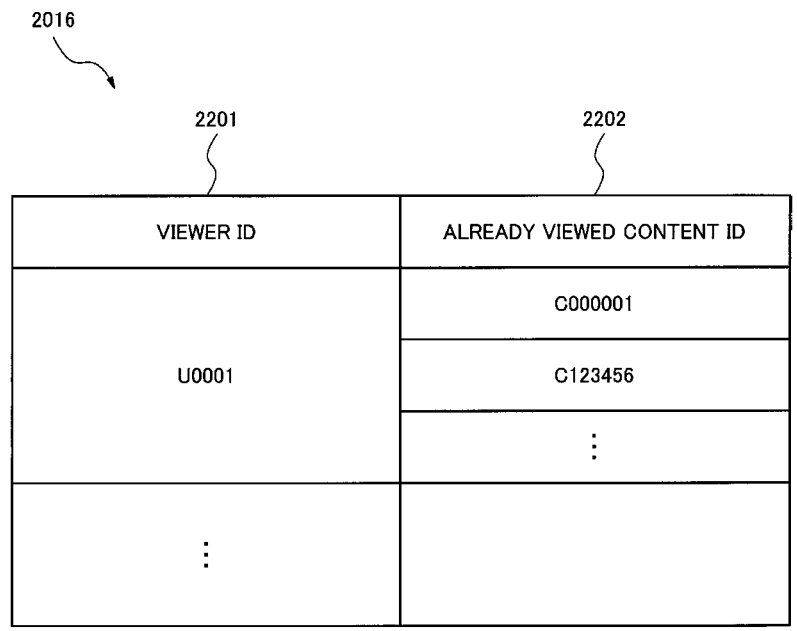
FIG. 22 is a figure showing a structure of an already viewed DB according to the seventh exemplary embodiment of the present invention.

FIG. 22 is a figure showing a structure of the already viewed DB 2016 according to this exemplary embodiment.

The already viewed DB 2016 accumulates already viewed content IDs 2202 by being made to correspond to a viewer ID 2201. As mentioned above, the already viewed DB 2016 may accumulate, in addition to the contents which the viewer viewed, the contents which are not viewed and which the viewer holds or the contents which one's family or one's friend owns.

<<Processing Procedure of the Video Processing Apparatus>>

Figure 23:
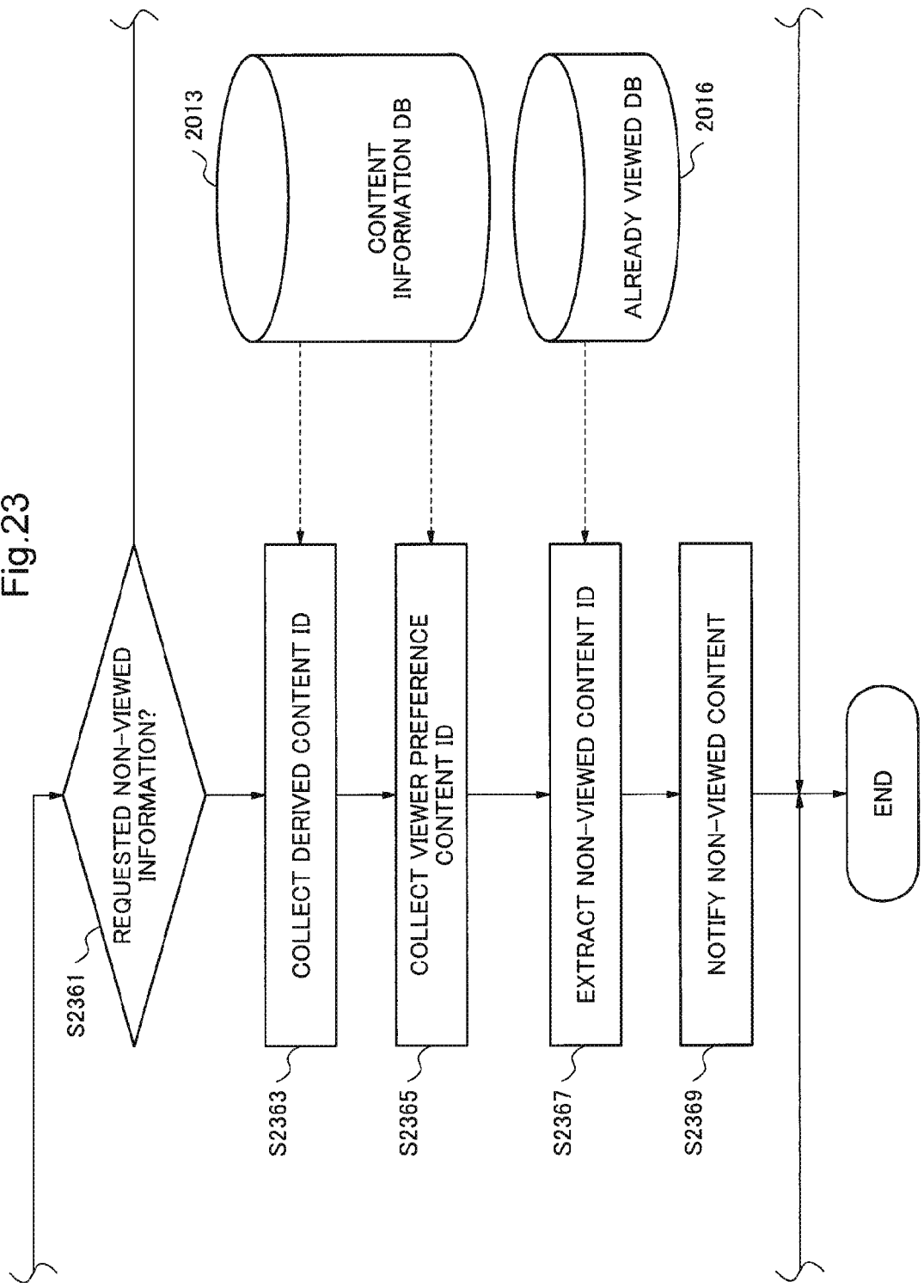
FIG. 23 is a flow chart showing a processing procedure of a video processing apparatus according to the seventh exemplary embodiment of the present invention.

FIG. 23 is a flow chart showing a processing procedure of the video processing apparatus 2010 according to this exemplary embodiment. This flow chart is added the content information DB 2013 and the already viewed DB 2016 and is executed by the CPU 410 of FIG. 4 by using the RAM 440, and each functional structure unit of FIG. 20 is realized. Further, in FIG. 23, only the steps for a case when not-viewed information is requested from the video viewing terminal are shown, and the explanation of other steps which are shown in FIG. 8, FIG. 11, FIG. 16 and FIG. 19 are omitted. It is also possible to include FIG. 23 in either one of them.

In Step S2361, it is determined whether or not the not-viewed information is requested from the video viewing terminal. In case the not-viewed information is requested from the video viewing terminal, it advances to Step S2363, and collects from the content information DB 2013 the derived content IDs which are selected from the frame feature values sent from the video viewing terminal. Next, in Step S2365, the content IDs which match with the viewer preference which is obtained from the viewer preference DB on the basis of the viewer ID from the video viewing terminal are collected from the content information DB 2013.

Next, in Step S2367, the already viewed content IDs are read from the already viewed DB 2016 on the basis of the viewer ID from the video viewing terminal, removed from the content ID groups collected in Steps S2363 and/or S2365, and the not-viewed contents are extracted. In Step S2369, extracted not-viewed contents are notified the viewer from the video viewing terminal. Form of the notification may be the content IDs, information such as the names of the contents, a part of the contents or thumbnails.

The Eighth Exemplary Embodiment

Next, a video processing system according to the eighth exemplary embodiment of the present invention will be explained. The video processing system according to this exemplary embodiment is different, compared with the seventh exemplary embodiment mentioned above, in a point that information notified to the viewer from the video viewing terminal is connection destination information (for example, URL) capable of acquiring the not-viewed content. According to this exemplary embodiment, it is possible, upon judgment of the preference of the viewer, to notify and introduce so that the not-viewed content of the viewer can be acquired by easy operation of the viewer. Further, in this exemplary embodiment, a part different from the seventh exemplary embodiment mentioned above will be explained. Since other structure and operation are similar as the seventh exemplary embodiment, their explanation will be omitted.

(Content Information DB)

Figure 24:
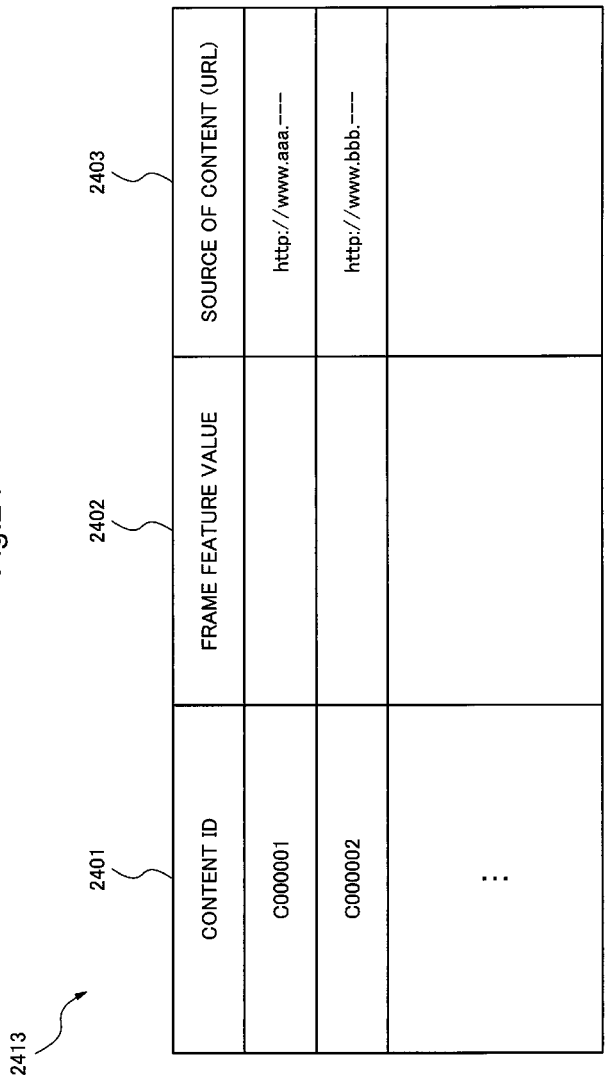
FIG. 24 is a figure showing a structure of a content information DB according to the eighth exemplary embodiment of the present invention.

FIG. 24 is a figure showing a data structure of a content information DB 2413 according to this exemplary embodiment.

The content information DB 2413 of FIG. 24 accumulates content IDs 2401 linked to frame feature values 2402 and acquisition sources of the contents. Further, although an example in which the acquisition sources of the contents which FIG. 24 shows are URLs is shown, contact addresses of content producers, content publishers or content distributors may also be fine.

Other Exemplary Embodiments

Although exemplary embodiments of the present invention are described in detail as above, a system or an apparatus which combined the separate characteristics contained in the respective exemplary embodiments in either way is also contained in the category of the present invention.

Also, the present invention may be applied to a system included a plurality of equipment or may be applied to an apparatus of stand-alone. Further, the present invention is applicable in case the control program which realizes the functions of the exemplary embodiments is supplied to the system or the apparatus directly or remotely. Accordingly, the control program installed in a computer in order to realize the functions of the present invention by the computer, a medium which stores the control program, or a WWW (World Wide Web) server which makes the control program to be downloaded is also contained in the category of the present invention.

This application claims priority based on Japanese Patent Application No. 2011-170864 filed on Aug. 4, 2011 and the disclosure thereof is incorporated herein in its entirety.

(Notes)

(Note 1)

A video processing apparatus includes:

a first storage means which stores, in correspondence to a viewer, frame feature values to characterize each frame of scenes constituted by a series of frames in a video content viewed by the viewer;

a second storage means which stores, as scene groups classified by attributes of the scenes, the frame feature values of scenes constitute by the series of frames;

an interest level accumulation means which compares the frame feature values stored in the first storage means with the frame feature values stored in the second storage means, and in case the compared frame feature values match, increases a score about the viewer which represents the interest level with respect to the scene group of which the frame feature values match; and a viewer preference determination means which determines that the scene groups of the which the scores are higher are the scene groups preferred by the viewer.

(Note 2)

The video processing apparatus according to note 1, wherein the first storage means stores the frame feature values of a part of the frames to characterize corresponding scenes of the series of frames contained in the scenes.

(Note 3)

The video processing apparatus according to note 1 or 2, wherein the first storage means further stores weights of corresponding in degree of the viewer requesting to view the video content, and the interest level accumulation means gives the weights for increasing the scores.

(Note 4)

The video processing apparatus according to note 3, wherein the weighting, corresponding to a viewing method of the video content by the viewer, gives larger weights to the viewing from a storage medium than a case of viewing as a program.

(Note 5)

The video processing apparatus according to note 3 or 4, wherein the weighting, corresponding to a reaction of the viewer for the viewing of the video content by the viewer, gives larger weights corresponding to a positive reaction by the viewer.

(Note 6)

The video processing apparatus according to either one of notes 1 to 5, wherein the attributes of the scenes corresponds to attributes of the video content containing the scenes, the second storage means further stores subjects which are contained in the scenes constituted by the series of frames as the scene groups which divided by the attributes of the scenes, the interest level accumulation means, on the basis of a combination of comparison of the frame feature values and comparison of the subjects, increases the scores representing the interest level for the scene groups.

(Note 7)

The video processing apparatus according to either one of notes 1 to 6, wherein the attributes of the scenes includes the attributes of the content showing to be a derived scene derived from one scene.

(Note 8)

The video processing apparatus according to either one of notes 1 to 7, further includes:

a third storage means which stores the video content containing the frame feature values of the scenes; and a notification means which searches information of the video content including the frame feature values of the scenes contained in the scene groups which the viewer preference determination means determined and which the viewer prefers from the third storage means, and notifies the video viewing terminal.

(Note 9)

The video processing apparatus according to either one of notes 1 to 8, further includes:

a fourth storage means which, in correspondence to the viewer, stores information of the video content which the viewer already viewed, wherein the notification means notifies the video viewing terminal by excluding the information of the video content which the viewer already viewed from the information of the video content including the frame feature values of the scenes which are searched from the third storage means and which are contained in the scene groups which the viewer prefers.

(Note 10)

The video processing apparatus according to either one of notes 1 to 9, wherein the frame feature values being data which combined differences of region feature values calculated for each region pair of a plurality of region pairs set with difference sizes for each frame for a number of the region pairs.

(Note 11)

The video processing apparatus according to note 10,
wherein the region feature values being represented by brightness.

(Note 12)

A control method of a video processing apparatus includes:
an interest level accumulation step which compares frame feature values to characterize each frame of scenes constituted by a series of frames in a video content stored in correspondence to a viewer and viewed by the viewer with frame feature values divided into groups by attributes in the scenes constituted by the series of frames and stored as scene groups, and in case the compared frame feature values match, increases a score about the viewer which represents an interest level with respect to the scene group of which the frame feature values match; and
a viewer preference determination step which determines that the scene groups of which the scores are higher are the scene groups preferred by the viewer.

(Note 13)

A control program making a computer execute:
an interest level accumulation step which compares frame feature values to characterize each frame matching in the compared frame of scenes constituted by a series of frames in a video content stored in correspondence to a viewer and viewed by the viewer and frame feature values divided into groups by attributes in the scenes constituted by the series of frames and stored as scene groups, and in case frame feature values match, increases a score about the viewer which represents an interest level with respect to the scene group of which the frame feature values match; and
a viewer preference determination step which determines that the scene groups of which the scores are higher are the scene groups preferred by the viewer.

(Note 14)

A video processing system which determines preference of a viewer on the basis of a video content viewed by the viewer, includes:
a frame feature value extraction means which extracts frame feature values which characterize each frame of scenes contained a series of frames in the video content viewed by the viewer;
a first storage means which stores the frame feature values which the frame feature value extraction means extracted in correspondence to the viewer;
a second storage means which groups the frame feature values of the scenes constituted by the series of frames into groups according to attributes included in the scenes and stories as scene groups;
an interest level accumulation means which compares the frame feature values stored in the first storage means with the frame feature values stored in the second storage means, and in case there are matching in the compared frame feature values, increases a score about the viewer which represents the interest level with respect to the scene group of which frame feature values match; and
a viewer preference determination means which determines that the scene groups of which the scores are higher are the scene groups preferred by the viewer.

(Note 15)

A viewer preference determination method which determines preference of a viewer on the basis of a video content viewed by the viewer, includes,
a frame feature value extraction step which extracts frame feature values to characterize each frame of scenes constituted by a series of frames in the video content viewed by the viewer;
an interest level accumulation step which compares frame feature values in the video content stored in correspondence to a viewer and viewed by the viewer with the frame feature values which are grouped into groups according to attributes in the scene constituted by the series of frames and stored as scene groups, and in case the compared frame feature values match, increases a score about the viewer which represents an interest level with respect to the scene group of which the frame feature values match; and
a viewer preference determination step which determines that the scene groups of which the scores are higher are the scene groups preferred by the viewer.

The invention claimed is:

1. A video processing apparatus comprising:
   a first storage unit which stores, in correspondence to a viewer, frame feature values to characterize each frame of scenes constituted by a series of frames in a video content viewed by the viewer;
   a second storage unit which stores, as scene groups classified by attributes of the scenes, the frame feature values of scenes constitute by the series of frames;
   an interest level accumulation unit which compares the frame feature values stored in the first storage unit with the frame feature values stored in the second storage unit, and in case the compared frame feature values match, increases a score about the viewer which represents the interest level with respect to the scene group of which the frame feature values match; and
   a viewer preference determination unit which determines that the scene groups of which the scores are higher are the scene groups preferred by the viewer,
   wherein the first storage unit further stores weights of corresponding in degree of the viewer requesting to view the video content, and the interest level accumulation unit gives the weights for increasing the scores, and
   wherein the weighting, corresponding to a viewing method of the video content by the viewer, gives larger weights to the viewing from a storage medium than a case of viewing as a program.

2. A video processing apparatus comprising:
   a first storage unit which stores, in correspondence to a viewer, frame feature values to characterize each frame of scenes constituted by a series of frames in a video content viewed by the viewer;
   a second storage unit which stores, as scene groups classified by attributes of the scenes, the frame feature values of scenes constitute by the series of frames;
   an interest level accumulation unit which compares the frame feature values stored in the first storage unit with the frame feature values stored in the second storage unit, and in case the compared frame feature values match, increases a score about the viewer which represents the interest level with respect to the scene group of which the frame feature values match; and
   a viewer preference determination unit which determines that the scene groups of which the scores are higher are the scene groups preferred by the viewer,
   wherein the first storage unit further stores weights of corresponding in degree of the viewer requesting to view the video content, and the interest level accumulation unit gives the weights for increasing the scores, and wherein the weighting, corresponding to a reaction of the viewer for the viewing of the video content by the viewer, gives larger weights corresponding to a positive reaction by the viewer.

3. A video processing apparatus comprising:
a first storage unit which stores, in correspondence to a viewer, frame feature values to characterize each frame of scenes constituted by a series of frames in a video content viewed by the viewer;
a second storage unit which stores, as scene groups classified by attributes of the scenes, the frame feature values of scenes constitute by the series of frames;
an interest level accumulation unit which compares the frame feature values stored in the first storage unit with the frame feature values stored in the second storage unit, and in case the compared frame feature values match, increases a score about the viewer which represents the interest level with respect to the scene group of which the frame feature values match; and
a viewer preference determination unit which determines that the scene groups of which the scores are higher are the scene groups preferred by the viewer,
wherein the attributes of the scenes corresponds to attributes of the video content containing the scenes,
the second storage unit further stores subjects which are contained in the scenes constituted by the series of frames as the scene groups which divided by the attributes of the scenes,
the interest level accumulation unit, on the basis of a combination of comparison of the frame feature values and comparison of the subjects, increases the scores representing the interest level for the scene groups.

4. A video processing apparatus comprising:
a first storage unit which stores, in correspondence to a viewer, frame feature values to characterize each frame of scenes constituted by a series of frames in a video content viewed by the viewer;
a second storage unit which stores, as scene groups classified by attributes of the scenes, the frame feature values of scenes constitute by the series of frames;
an interest level accumulation unit which compares the frame feature values stored in the first storage unit with the frame feature values stored in the second storage unit, and in case the compared frame feature values match, increases a score about the viewer which represents the interest level with respect to the scene group of which the frame feature values match;
a viewer preference determination unit which determines that the scene groups of which the scores are higher are the scene groups preferred by the viewer;
a third storage unit which stores the video content containing the frame feature values of the scenes; and
a notification unit which searches information of the video content including the frame feature values of the scenes contained in the scene groups which the viewer preference determination unit determined and which the viewer prefers from the third storage unit, and notifies a video viewing terminal.

5. The video processing apparatus according to claim 4, further comprising:
a fourth storage unit which, in correspondence to the viewer, stores information of the video content which the viewer already viewed,
wherein the notification unit notifies the video viewing terminal by excluding the information of the video content which the viewer already viewed from the information of the video content including the frame feature values of the scenes which are searched from the third storage unit and which are contained in the scene groups which the viewer prefers.

6. The video processing apparatus according to claim 4, wherein the first storage unit stores the frame feature values of a part of the frames to characterize corresponding scenes of the series of frames contained in the scenes.

7. The video processing apparatus according to claim 4, wherein the first storage unit further stores weights of corresponding in degree of the viewer requesting to view the video content, and the interest level accumulation unit gives the weights for increasing the scores.

8. The video processing apparatus according to claim 4, wherein the attributes of the scenes includes the attributes of the content showing to be a derived scene derived from one scene.

9. The video processing apparatus according to claim 4, wherein the frame feature values being data which combined differences of region feature values calculated for each region pair of a plurality of region pairs set with difference sizes for each frame for a number of the region pairs, and wherein the region feature values being represented by brightness.

10. A video processing apparatus comprising:
a first storage unit which stores, in correspondence to a viewer, frame feature values to characterize each frame of scenes constituted by a series of frames in a video content viewed by the viewer;
a second storage unit which stores, as scene groups classified by attributes of the scenes, the frame feature values of scenes constitute by the series of frames;
an interest level accumulation unit which compares the frame feature values stored in the first storage unit with the frame feature values stored in the second storage unit, and in case the compared frame feature values match, increases a score about the viewer which represents the interest level with respect to the scene group of which the frame feature values match; and
a viewer preference determination unit which determines that the scene groups of which the scores are higher are the scene groups preferred by the viewer,
wherein the frame feature values being data which combined differences of region feature values calculated for each region pair of a plurality of region pairs set with difference sizes for each frame for a number of the region pairs.

11. A control method of a video processing apparatus comprising:
comparing frame feature values to characterize each frame of scenes constituted by a series of frames in a video content stored in correspondence to a viewer and viewed by the viewer with frame feature values divided into groups by attributes in the scenes constituted by the series of frames and stored as scene groups, and in case the compared frame feature values match, increasing a score about the viewer which represents an interest level with respect to the scene group of which the frame feature values match;
determining that the scene groups of which the scores are higher are the scene groups preferred by the viewer;
storing the video content containing the frame feature values of the scenes;
searching information of the video content including the frame feature values of the scenes contained in the scene groups which were determined and which the viewer prefers; and notifying a video viewing terminal.

12. A non-transitory computer readable medium storing a program executed by a computer, comprising
   comparing frame feature values to characterize each frame of scenes constituted by a series of frames in a video content stored in correspondence to a viewer and viewed by the viewer with frame feature values divided into groups by attributes in the scenes constituted by the series of frames and stored as scene groups, and in case the compared frame feature values match, increasing a score about the viewer which represents an interest level with respect to the scene group of which the frame feature values match;
   determining that the scene groups of which the scores are higher are the scene groups preferred by the viewer;
   storing the video content containing the frame feature values of the scenes;
   searching information of the video content including the frame feature values of the scenes contained in the scene groups which were determined and which the viewer prefers; and
   notifying a video viewing terminal.

13. A video processing system which determines preference of a viewer on the basis of a video content viewed by the viewer, comprising:
   a frame feature value extraction unit which extracts frame feature values which characterize each frame of scenes constituted by a series of frames contained in the video content viewed by the viewer;
   a first storage unit which stores the frame feature values which the frame feature value extraction unit extracted in correspondence to the viewer;
   a second storage unit which groups the frame feature values of the scenes constituted by the series of frames into groups according to attributes included in the scenes and stories as scene groups;
   an interest level accumulation unit which compares the frame feature values stored in the first storage unit with the frame feature values stored in the second storage unit, and in case there are matching in the compared frame feature values, increases a score about the viewer which represents the interest level with respect to the scene group of which frame feature values match;
   a viewer preference determination unit which determines that the scene groups of which the scores are higher are the scene groups preferred by the viewer;
   a third storage unit which stores the video content containing the frame feature values of the scenes; and
   a notification unit which searches information of the video content including the frame feature values of the scenes contained in the scene groups which the viewer preference determination unit determined and which the viewer prefers from the third storage unit, and notifies a video viewing terminal.

14. A viewer preference determination method which determines preference of a viewer on the basis of a video content viewed by the viewer, comprising:
   extracting frame feature values to characterize each frame of scenes constituted by a series of frames in the video content viewed by the viewer;
   comparing frame feature values in the video content stored in correspondence to a viewer and viewed by the viewer with the frame feature values which are grouped into groups according to attributes in the scene constituted by the series of frames and stored as scene groups, and in case the compared frame feature values match, increasing a score about the viewer which represents an interest level with respect to the scene group of which the frame feature values match;
   determining that the scene groups of which the scores are higher are the scene groups preferred by the viewer;
   storing the video content containing the frame feature values of the scenes;
   searching information of the video content including the frame feature values of the scenes contained in the scene groups which were determined and which the viewer prefers; and
   notifying a video viewing terminal.

15. A video processing apparatus comprising:
   a first storage means for storing, in correspondence to a viewer, frame feature values to characterize each frame of scenes constituted by a series of frames in a video content viewed by the viewer;
   a second storage means for storing, as scene groups classified by attributes of the scenes, the frame feature values of scenes constituted by the series of frames;
   an interest level accumulation means for comparing the frame feature values stored in the first storage means and the frame feature values stored in the second storage means, and in case the compared frame feature values match, increasing a score about the viewer which represents the interest level with respect to the scene group of which the frame feature values match;
   a viewer preference determination means for determining that the scene groups of which the scores are higher are the scene groups preferred by the viewer;
   a third storage unit which stores the video content containing the frame feature values of the scenes; and
   a notification unit which searches information of the video content including the frame feature values of the scenes contained in the scene groups which the viewer preference determination unit determined and which the viewer prefers from the third storage unit, and notifies a video viewing terminal.

* * * * *

UNITED STATES PATENT AND TRADEMARK OFFICE
CERTIFICATE OF CORRECTION

| | |
|---|---|
| PATENT NO. | : 9,070,040 B2 |
| APPLICATION NO. | : 14/236752 |
| DATED | : June 30, 2015 |
| INVENTOR(S) | : Hiroo Harada and Naotake Fujita |

It is certified that error appears in the above-identified patent and that said Letters Patent is hereby corrected as shown below:

Title page, item 57, lines 15-16, "scene groups of the which the scores" should read
-- scene groups of which the scores --.

In the Claims

Claim 1, col. 22, line 29, "scenes constitute by the series" should read -- scenes constituted by the series --.

Claim 2, col. 22, line 55, "scenes constitute by the series" should read -- scenes constituted by the series --.

Claim 3, col. 23, line 14, "scenes constitute by the series" should read -- scenes constituted by the series --.

Claim 4, col. 23, line 42, "scenes constitute by the series" should read -- scenes constituted by the series --.

Claim 9, col. 24, line 22, "difference sizes" should read -- different sizes --.

Claim 10, col. 24, line 32, "scenes constitute by the series" should read -- scenes constituted by the series --.

Claim 10, col. 24, line 46, "difference sizes" should read -- different sizes --.

Claim 12, col. 25, line 3, insert a -- : -- after "comprising".

Signed and Sealed this
Seventeenth Day of May, 2016

Michelle K. Lee
*Director of the United States Patent and Trademark Office*